US012136512B2

(12) United States Patent
Ishida

(10) Patent No.: US 12,136,512 B2
(45) Date of Patent: Nov. 5, 2024

(54) COIL COMPONENT AND METHOD OF MANUFACTURING THE SAME

(71) Applicant: Murata Manufacturing Co., Ltd., Kyoto-fu (JP)

(72) Inventor: Keiichi Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 748 days.

(21) Appl. No.: 17/199,922

(22) Filed: Mar. 12, 2021

(65) Prior Publication Data

US 2021/0304955 A1 Sep. 30, 2021

(30) Foreign Application Priority Data

Mar. 30, 2020 (JP) ................................ 2020-059521

(51) Int. Cl.

*H01F 27/30* (2006.01)
*H01F 17/02* (2006.01)
*H01F 27/28* (2006.01)
*H01F 27/32* (2006.01)
*H01F 41/02* (2006.01)
*H01F 41/12* (2006.01)

(52) U.S. Cl.

CPC ............ *H01F 27/32* (2013.01); *H01F 17/02* (2013.01); *H01F 27/2823* (2013.01); *H01F 41/0246* (2013.01); *H01F 41/12* (2013.01)

(58) Field of Classification Search

CPC .................................................. H01F 27/2823
USPC .......................................................... 336/199
See application file for complete search history.

(56) References Cited

U.S. PATENT DOCUMENTS

2015/0035634 A1* 2/2015 Nakamura ............ H01F 41/046 336/170
2017/0178790 A1* 6/2017 Kim .................... H01F 27/2804
2017/0236633 A1* 8/2017 Park ...................... H01F 27/323 336/55
2018/0182531 A1* 6/2018 Muneuchi ............. H01F 27/255
2019/0244745 A1 8/2019 Kojima et al.

FOREIGN PATENT DOCUMENTS

CN 104900374 A 9/2015
JP 2002-83732 A 3/2002
JP 2003-272916 A 9/2003
JP 2009-218400 A 9/2009

(Continued)

*Primary Examiner* — Ronald Hinson
(74) *Attorney, Agent, or Firm* — Studebaker & Brackett PC

(57) ABSTRACT

A coil component includes a body and an external electrode. The body includes a coil conductor formed by winding a substantially rectangular wire covered with an insulating film, and a magnetic-body section containing a magnetic-body particle and a resin. The external electrode is electrically connected to an exposed surface of an extended portion of the coil conductor and is disposed at a surface of the body, the exposed surface being exposed at the surface of the body. The body includes first and second principal surfaces that face each other. At the wire, an average thickness of a portion of the insulating film that covers a first surface facing the first principal surface and extending in a direction orthogonal to a winding axis of the coil conductor is larger than average thicknesses of portions of the insulating film that cover other surfaces, orthogonal to the first surface, of the wire.

15 Claims, 12 Drawing Sheets

(56) References Cited

FOREIGN PATENT DOCUMENTS

| | | | |
|---|---|---|---|
| JP | 2011-009618 | A | 1/2011 |
| JP | 2013-12401 | A | 1/2013 |
| JP | 2015-126201 | A | 7/2015 |
| JP | 2018-107199 | A | 7/2018 |
| WO | 2018/088264 | A1 | 5/2018 |

* cited by examiner

SECTION ALONG III-III

SECTION ALONG IV-IV

ENLARGED VIEW OF PORTION a

ENLARGED VIEW OF PORTION b

ENLARGED VIEW OF PORTION e

ENLARGED VIEW OF PORTION f

ENLARGED VIEW OF PORTION f

COIL COMPONENT AND METHOD OF MANUFACTURING THE SAME

CROSS-REFERENCE TO RELATED APPLICATION

This application claims benefit of priority to Japanese Patent Application No. 2020-059521, filed Mar. 30, 2020, the entire content of which is incorporated herein by reference.

BACKGROUND

Technical Field

The present disclosure relates to a coil component and a method of manufacturing the same.

Background Art

As a coil component known in the art, a winding-integrated-type coil in which an air-cored coil, such as a coil, is sealed with, for example, a magnetic mold material is disclosed (refer to, for example, Japanese Unexamined Patent Application Publication No. 2011-009618). Such a mold coil is acquired in the following way. That is, in a mold coil in which a wire is sealed with a mold resin, after rounding the corners of a molded item by utilizing the impact of powder accelerated by air, a coil terminal and an external electrode are joined to each other to acquire the mold coil. The mold resin contains magnetic powder.

In a coil component, such as that disclosed in Japanese Unexamined Patent Application Publication No. 2011-009618, since a molded body in which a wire is sealed with a mold resin containing magnetic powder is to be formed, when such a molded body is formed, the magnetic powder may become stuck in or may pierce through an insulating film of the wire. Therefore, a short circuit may occur in a coil conductor.

SUMMARY

Accordingly, the present disclosure provides a coil component that is made highly reliable by making it possible to suppress occurrence of a short circuit in a coil conductor when manufacturing the coil component.

According to preferred embodiments of the present disclosure, there is provided a coil component including a body that includes a coil conductor in which a substantially rectangular wire covered with an insulating film is wound, and a magnetic-body section that contains a metal magnetic-body particle and a resin; and including an external electrode that is electrically connected to an exposed surface of an extended portion of the coil conductor and that is disposed at a surface of the body. The exposed surface is exposed at the surface of the body. In the coil component, the body includes a first principal surface and a second principal surface that faces the first principal surface. At the substantially rectangular wire, an average thickness of a portion of the insulating film that covers a first surface facing the first principal surface and extending in a direction orthogonal to a winding axis of the coil conductor is larger than average thicknesses of portions of the insulating film that cover other surfaces of the substantially rectangular wire, the other surfaces being orthogonal to the first surface.

In the coil component according to preferred embodiments of the present disclosure, since the portion of the insulating film of the substantially rectangular wire that covers a surface which is pressed when manufacturing the coil component has a thickness that is larger than the thicknesses of the portions of the insulating film that cover the other surfaces, impact resistance is increased, as a result of which it is possible to suppress occurrence of short-circuit defects that may occur when the magnetic-body particle pierces through the insulating film. In such a coil component according to preferred embodiments of the present disclosure, since it is possible to increase the molding pressure in compression molding, it is possible to increase the ability to fill with the magnetic-body particle and to thus improve the efficiency with which inductance is obtained.

According to preferred embodiments of the present disclosure, it is possible to provide a coil component that is made highly reliable by making it possible to suppress occurrence of a short circuit in a coil conductor when manufacturing the coil component.

The aforementioned object, other objects, features, and advantages of the present disclosure will become more apparent from the following detailed description of preferred embodiments of the present disclosure with reference to the attached drawings.

DETAILED DESCRIPTION

1. Coil Component

Coil components according to the present disclosure are described in detail below with reference to the drawings.

Figure 1:
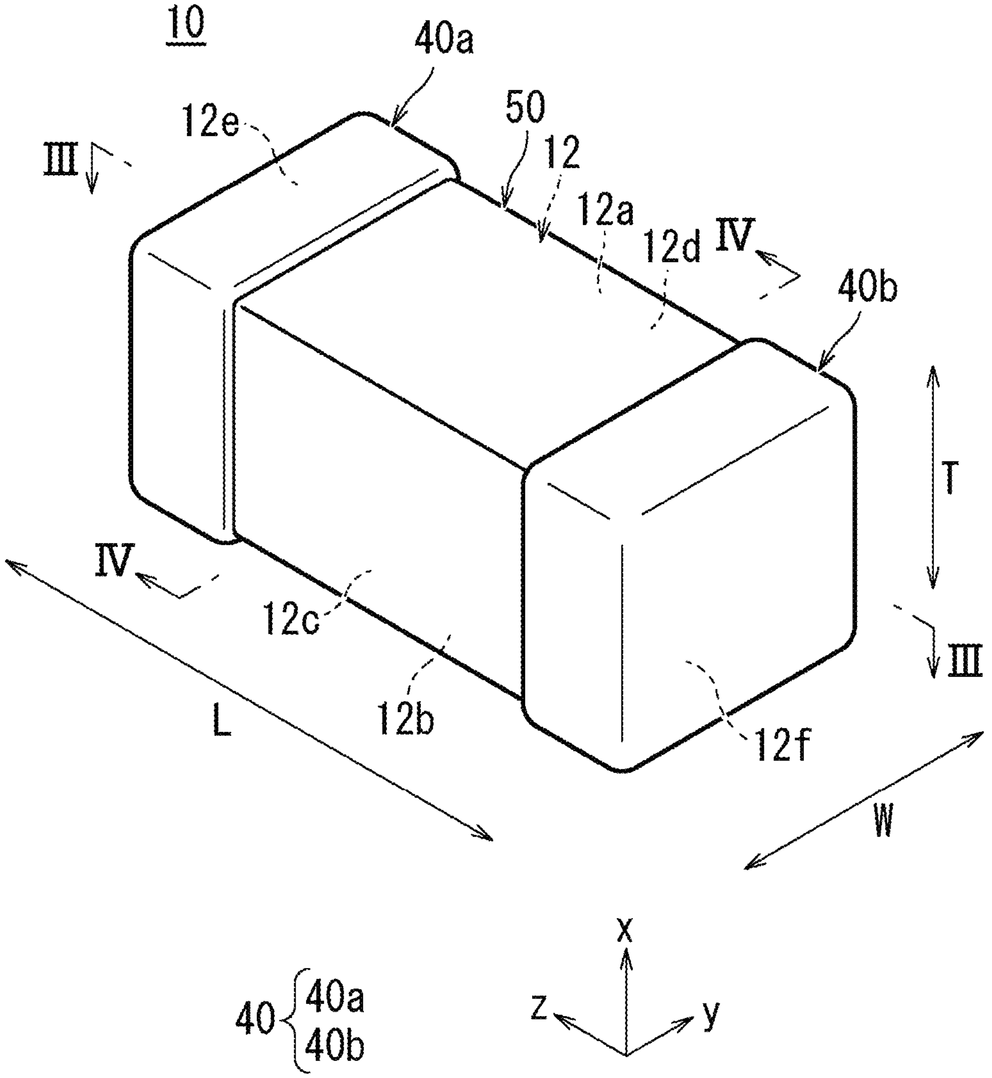
FIG. 1 is an external perspective view schematically illustrating a coil component according to a first embodiment of the present disclosure.
Figure 2:
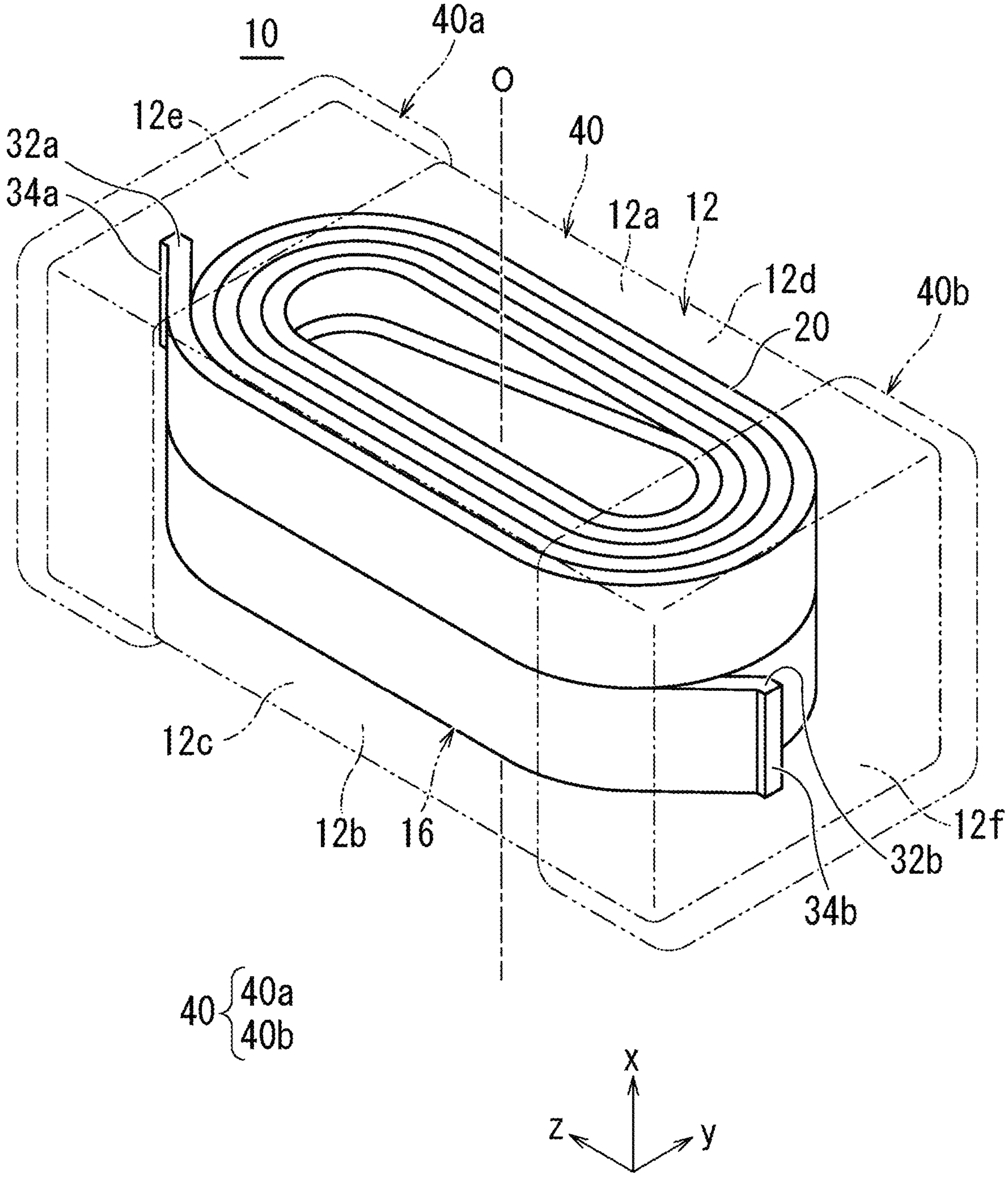
FIG. 2 is a transparent, perspective view of a magnetic-body section having a coil conductor buried therein in the coil component shown in FIG. 1.
Figure 3:
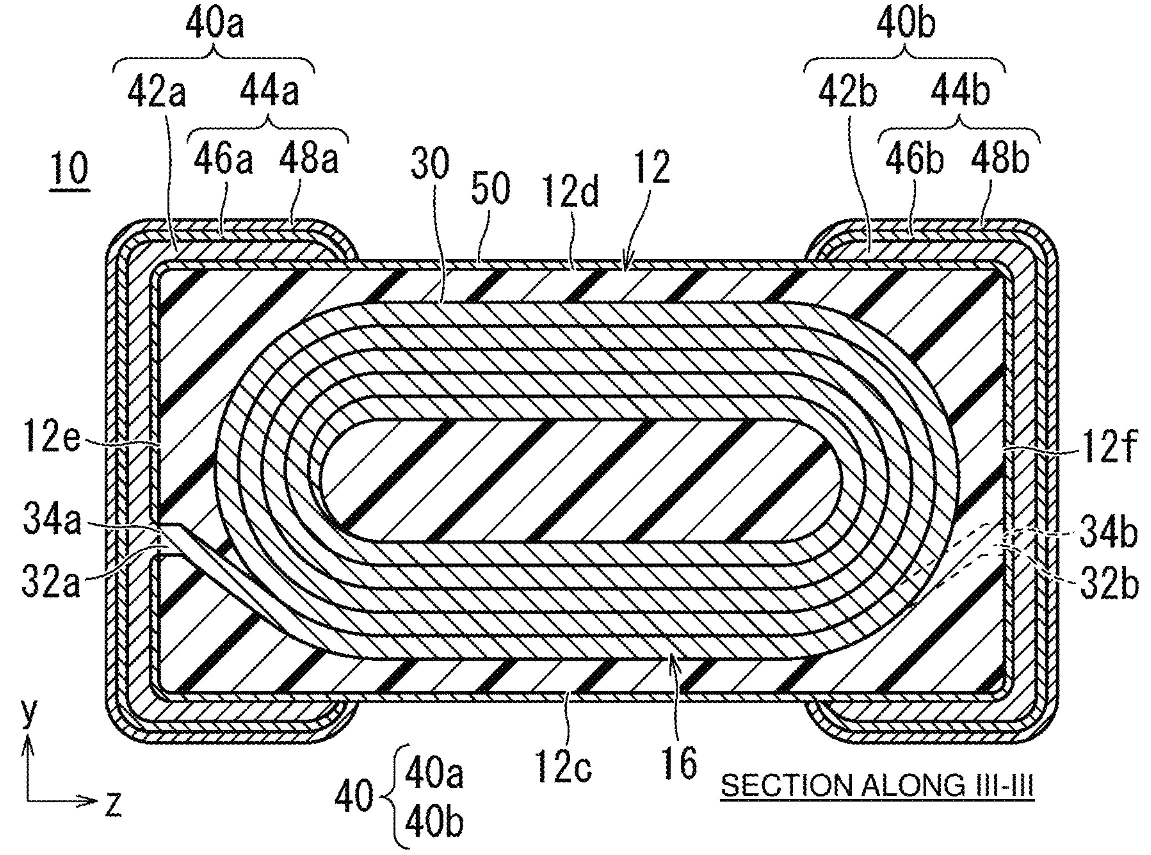
FIG. 3 is a sectional view along line in FIG. 1.
Figure 4:
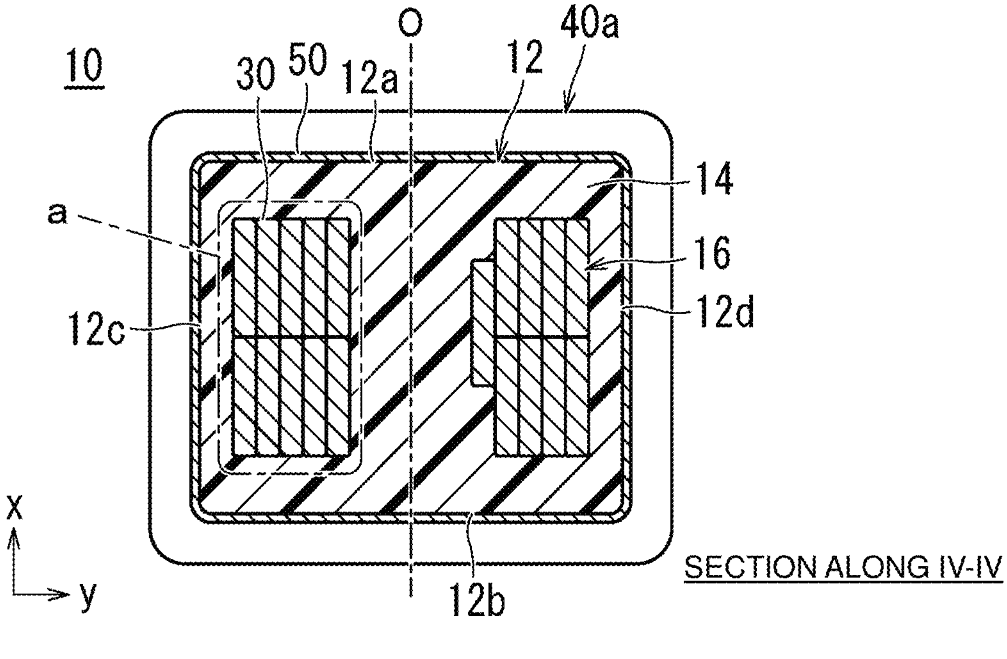
FIG. 4 is a sectional view along line IV-IV in FIG. 1.
Figure 5:
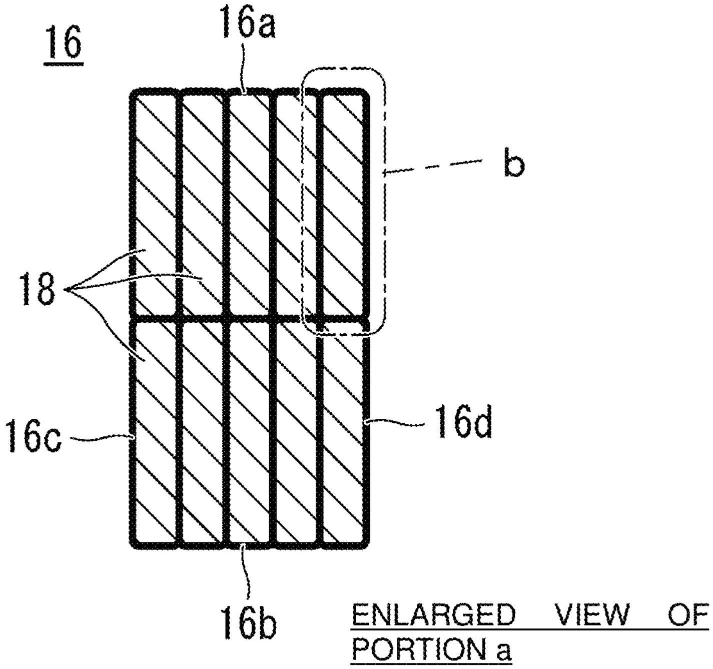
FIG. 5 is an enlarged sectional view of a portion a in FIG. 4.

FIG. 1 is an external perspective view schematically illustrating a coil component according to a first embodiment of the present disclosure. FIG. 2 is a transparent, perspective view of a magnetic-body section having a coil conductor buried therein in the coil component shown in FIG. 1. FIG. 3 is a sectional view along line in FIG. 1. FIG. 4 is a sectional view along line IV-IV in FIG. 1. FIG. 5 is an enlarged sectional view of a portion a in FIG. 4.

A coil component 10 includes a substantially rectangular parallelepiped body 12 and external electrodes 40.

(A) Body

The body 12 includes a magnetic-body section 14 and a coil conductor 16 that is buried in the magnetic-body section 14. The body 12 includes a first principal surface 12*a* and a second principal surface 12*b* that face each other in a pressing direction x, a first side surface 12*c* and a second side surface 12*d* that face each other in a width direction y that is orthogonal to the pressing direction x, and a first end surface 12*e* and a second end surface 12*f* that face each other in a length direction z that is orthogonal to the pressing direction x and the width direction y. The dimensions of the body 12 are not particularly limited to certain dimensions.

(B) Magnetic-Body Section

The magnetic-body section 14 contains magnetic-body particles and a resin material.

Although the resin material is not particularly limited to certain resin materials, examples thereof include thermosetting resins, such as organic materials including epoxy resin, phenol resin, polyester resin, polyimide resin, and polyolefin resin. Only one type of such substances above or two or more types of such substances above may be used for the resin material.

Although the magnetic-body particles desirably include first metal magnetic-body particles and second metal magnetic-body particles, the magnetic-body particles may include only the first metal magnetic-body particles.

The first metal magnetic-body particles have an average particle size of about 10 μm or greater. The average particle size of the first metal magnetic-body particles is, desirably, about 200 μm or less, more desirably, about 100 μm or less, and, even more desirably, about 80 μm or less. When the average particle size of the first metal magnetic-body particles is about 10 μm or greater, the magnetic properties of the magnetic-body section are improved.

The second metal magnetic-body particles have an average particle size that is smaller than the average particle size of the first metal magnetic-body particles. The second metal magnetic-body particles have an average particle size of about 5 μm or less. In this way, by causing the average particle size of the second metal magnetic-body particles to be smaller than the average particle size of the first metal magnetic-body particles, the ability with which the metal magnetic-body particles fill the magnetic-body section 14 is increased, as a result of which it is possible to improve the magnetic properties of the coil component 10.

Here, the term "average particle size" refers to an average particle size D50 (a particle size equivalent to 50% in a volume-based cumulative percentage). The average particle size D50 can be measured with, for example, a dynamic light-scattering particle-size analyzer (manufactured by NIKKISO CO., LTD., UPA).

Although the first metal magnetic-body particles and the second metal magnetic-body particles are not particularly limited to certain particles, examples thereof include iron, cobalt, nickel, or cadmium, or an alloy of one type of such substances above or two or more types of such substances above. The first metal magnetic-body particles and the second metal magnetic-body particles are desirably iron particles or iron-alloy particles. Although the iron alloy is not particularly limited to certain iron alloys, examples thereof include Fe—Si, Fe—Si—Cr, Fe—Ni, and Fe—Si—Al. Only one type of such substances above or two or more types of such substances above may be used for the first metal magnetic-body particles and the second metal magnetic-body particles.

A surface of each first metal magnetic-body particle and a surface of each second metal magnetic-body particle may be covered with an insulating film. By covering the surface of each metal magnetic-body particle with an insulating film, it is possible to increase the internal resistance of the magnetic-body section 14. Since the insulating properties of the surfaces of the metal magnetic-body particles are ensured by the insulating film, it is possible suppress short-circuit defects occurring with respect to the coil conductor 16.

Note that the magnetic-body particles may be ferrite particles.

Examples of the material of the insulating film include silicon oxides, phosphate-based glass, and bismuth-based glass. In particular, it is desirable to use an insulating film formed from zinc-phosphate-based glass in which the metal magnetic-body particles are subjected to mechano-chemical treatment.

Although the thickness of the insulating film is not particularly limited to certain thicknesses, the thickness of the insulating film may be, desirably, about 5 nm or greater and about 500 nm or less (i.e., from about 5 nm to about 500 nm), more desirably, about 5 nm or greater and about 100 nm or less (i.e., from about 5 nm to about 100 nm), and, even more desirably, about 10 nm or greater and about 100 nm or less (i.e., from about 10 nm to about 100 nm). When the thickness of the insulating film is made large, it is possible to further increase the resistance of the magnetic-body section 14. When the thickness of the insulating film is made small, it is possible to further increase the quantity of metal magnetic-body particles, as a result of which the magnetic properties of the magnetic-body section 14 are improved.

With respect to the entire magnetic-body section 14, the quantity of first metal magnetic-body particles and the quantity of second metal magnetic-body particles contained in the magnetic-body section 14 are, desirably, about 50 vol % or greater, more desirably, about 60 vol % or greater, and, even more desirably, about 70 vol % or greater. By causing the quantity of first metal magnetic-body particles and second metal magnetic-body particles contained to be in such a range, the magnetic properties of the coil component of the present disclosure are improved. With respect to the entire magnetic-body section 14, the quantity of first metal magnetic-body particles and the quantity of second metal magnetic-body particles contained are, desirably, about 99 vol % or less, more desirably, about 95 vol % or less, and, even more desirably, about 90 vol % or less. By causing the quantity of first metal magnetic-body particles and second metal magnetic-body particles contained to be in such a range, it is possible to further increase the resistance of the magnetic-body section 14.

In a surface portion of the magnetic-body section 14, a region that is adjacent to the coil conductor 16 may be removed. By removing the magnetic-body section 14 at the region adjacent to the coil conductor 16, a gap between the magnetic-body section 14 and the coil conductor 16 is increased and media easily enters when barrel plating is performed, as a result of which a plating film is formed over a wider area of the coil conductor 16. Therefore, an increase in joining strength and a reduction in electrical resistance are expected.

(C) Coil Conductor

The coil conductor 16 includes a winding portion 30 that is formed by winding in the form of a coil a conductive belt body 18, and a first extended portion 32*a* and a second extended portion 32*b*. The first extended portion 32*a* is extended to one side of the winding portion 30 and the second extended portion 32*b* is extended to the other side of the winding portion 30. The coil conductor 16 is formed by winding the conductive belt body 18 into a substantially alpha shape. The winding portion 30 is wound into two layers.

The first extended portion 32*a* is exposed from the first end surface 12*e* of the body 12 to dispose a first exposed portion 34*a*, and the second extended portion 32*b* is exposed from the second end surface 12*f* of the body 12 to dispose a second exposed portion 34*b*.

As shown in FIGS. 6 to 9, the conductive belt body 18 includes plate surfaces 18*a* and plate surfaces 18*b* that face each other, and side end surfaces 18*c* and side end surfaces 18*d* that face each other. In the conductive belt body 18 of the coil conductor 16, the plate surfaces 18*a* and the plate surfaces 18*b* are orthogonal to the side end surfaces 18*c* and the side end surfaces 18*d*. The conductive belt body 18 includes a substantially linear rectangular wire 20 that is substantially rectangular in cross section, and an insulating film 22 that covers a surface of the substantially rectangular wire 20.

In the conductive belt body 18 of the coil conductor 16, the side end surfaces 18*c* face the first principal surface 12*a* of the body 12, and the side end surfaces 18*d* face the second principal surface 12*b* of the body 12.

Figure 8A:
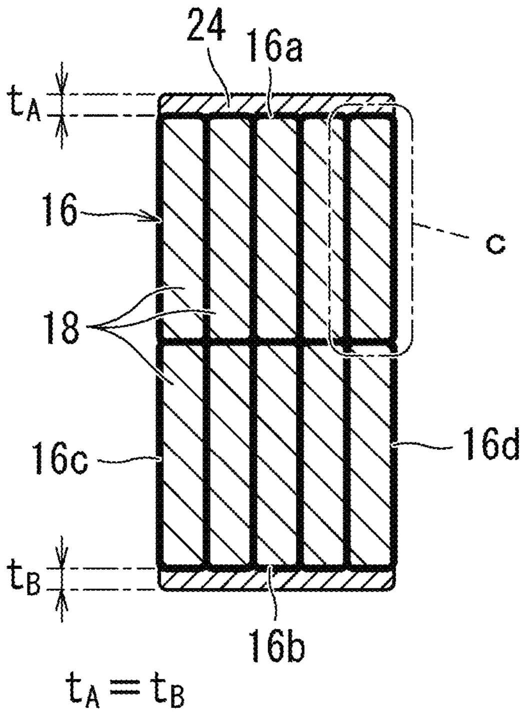
FIG. 8A is an enlarged sectional view of another example of portion a in FIG. 4.
Figure 8B:
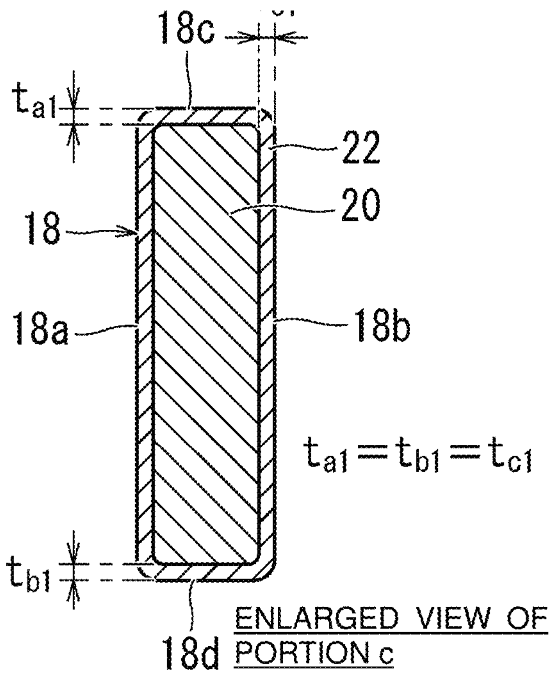
FIG. 8B is an enlarged sectional view of a portion c.
Figure 9A:
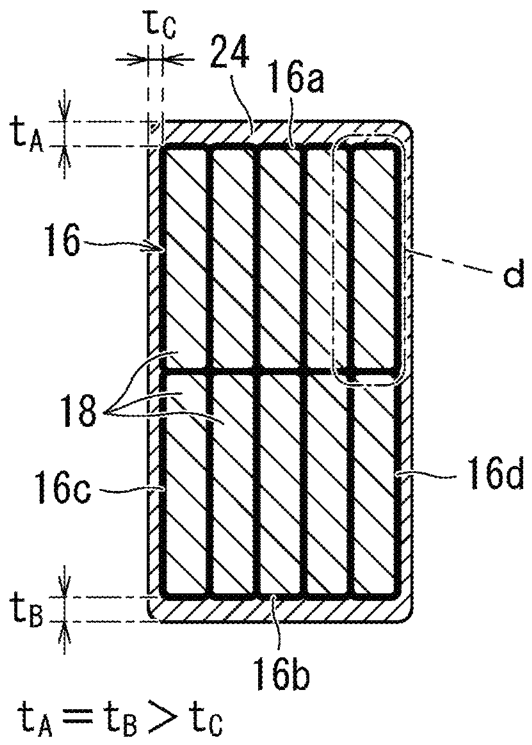
FIG. 9A is an enlarged sectional view of another example of portion a in FIG. 4.
Figure 9B:
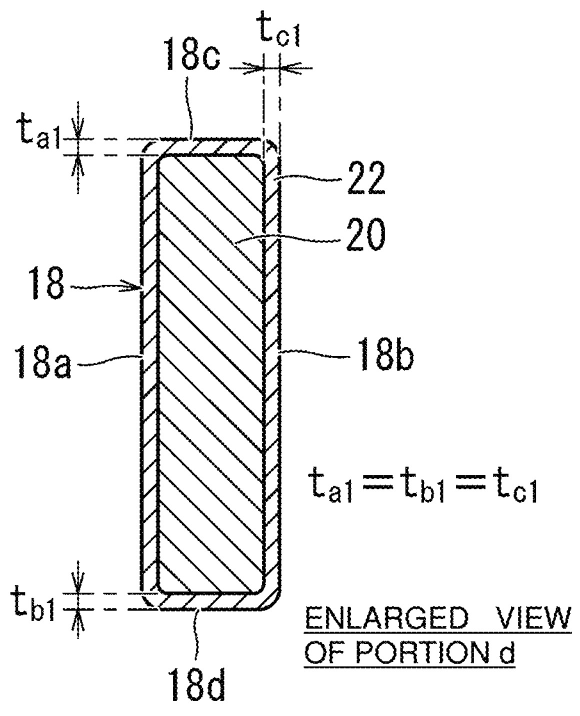
FIG. 9B is an enlarged sectional view of a portion d.

As shown in FIGS. 8 and 9, the coil conductor 16 includes a first principal surface 16*a* of the coil conductor 16 that is formed from the plurality of side end surfaces 18*c*, a second principal surface 16*b* of the coil conductor 16 that is formed from the plurality of side end surfaces 18*d*, a first side surface 16*c* of the coil conductor 16 that is formed from the plurality of plate surfaces 18*a*, and a second side surface 16*d* of the coil conductor 16 that is formed from the plurality of plate surfaces 18*b*.

The first principal surface 16*a* of the coil conductor 16 faces the first principal surface 12*a* of the body 12, and the second principal surface 16*b* of the coil conductor 16 faces the second principal surface 12*b* of the body 12.

The first side surface 16*c* and the second side surface 16*d* of the coil conductor 16 are orthogonal to the first principal surface 16*a* and the second principal surface 16*b* of the coil conductor 16.

As shown in FIG. 2, the winding portion 30 of the coil conductor 16 is wound around a winding axis O as a center. The coil conductor 16 is wound so that the plate surfaces 18*a* and the plate surfaces 18*b* overlap each other with the plate surfaces 18*a* and the plate surfaces 18*b* of the conductive belt body 18 being substantially parallel to the winding axis O and the side end surfaces 18*c* and the side end surfaces 18*d* of the conductive belt body 18 being substantially perpendicular to the winding axis O. Note that, in FIG. 2, the coil conductor 16 may be wound in a substantially oval form, in a substantially elliptical form, or in a circular form.

For example, the width of the substantially rectangular wire 20 at the plate surfaces 18*a* and 18*b* is about 15 μm or greater and about 200 μm or less (i.e., from about 15 μm to about 200 μm), and the width of the substantially rectangular wire 20 at the side end surfaces 18*c* and 18*d* is about 50 μm or greater and about 500 μm or less (i.e., from about 50 μm to about 500 μm).

The substantially rectangular wire 20 of the conductive belt body 18 is formed from, for example, a metal wire or a wire. Although the conductive material of the substantially rectangular wire 20 is not particularly limited to certain conductive materials, examples thereof include metal components including Ag, Au, Cu, Ni, Sn, and an alloy thereof. As the conductive material, copper is desirably used. As the conductive material, only one type of such substances above or two or more types of such substances above may be used.

A surface of the substantially rectangular wire 20 is covered with an insulating substance to form the insulating film 22. By covering the substantially rectangular wire 20 with an insulating substance, it is possible to more reliably insulate portions of the wound conductive belt body 18 from each other and more reliably insulate the conductive belt body 18 and the magnetic-body section 14 from each other.

Note that the insulating film 22 is not formed at a portion of each of the first exposed portion 34*a* and the second exposed portion 34*b* of the conductive belt body 18 that forms the coil conductor 16. Therefore, the external electrodes 40 are easily formed by plating. In addition, it is possible to further reduce the resistance at an electrical connection between the coil conductor 16 and the external electrodes 40.

Although the insulating substance of the insulating film 22 is not particularly limited to certain insulating substances, the insulating substance is at least one type selected from, for example, polyimide resin, polyamide resin, polyurethane resin, polyamide-imide resin, polyester resin, and enamel resin.

Figure 6:
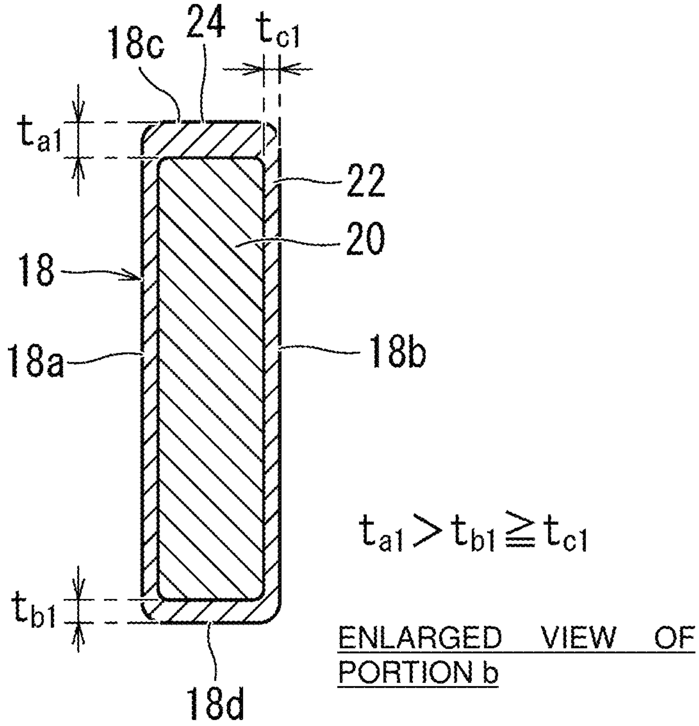
FIG. 6 is an enlarged sectional view of a portion b in FIG. 5.

As shown in FIG. 6, at the substantially rectangular wire 20, an average thickness $t_{a1}$ of a portion of the insulating film 22 that covers each side end surface 18*c* facing the first principal surface 12*a* and extending in a direction orthogonal to the winding axis O of the coil conductor 16 is larger than average thicknesses of portions of the insulating film 22 that cover the other surfaces of the substantially rectangular wire 20, that is, an average thickness $t_{c1}$ of portions of the insulating film 22 that cover the plate surfaces 18*a* and the plate surfaces 18*b*, and an average thickness $t_{b1}$ of a portion of the insulating film 22 that covers the side end surfaces 18*d*. Here, the relationship between the average thicknesses of the portions of the insulating film 22 satisfies $t_{a1}>t_{b1}\geq t_{c1}$. The average thickness $t_{a1}$ of the insulating film 22 is desirably about 4 μm or greater and about 20 μm or less (i.e., from about 4 μm to about 20 μm), and the average thickness $t_{b1}$ of the insulating film 22 and the average thickness $t_{c1}$ of the insulating film 22 are desirably about 1 μm or greater and about 10 μm or less (i.e., from about 1 μm to about 10 μm). Here, when the particle size of the average particle size D50 of the second metal magnetic-body particles is D, it is desirable that the average thickness tai of the insulating film 22 satisfy the relationship of $D<t_{a1}$.

Figure 7:
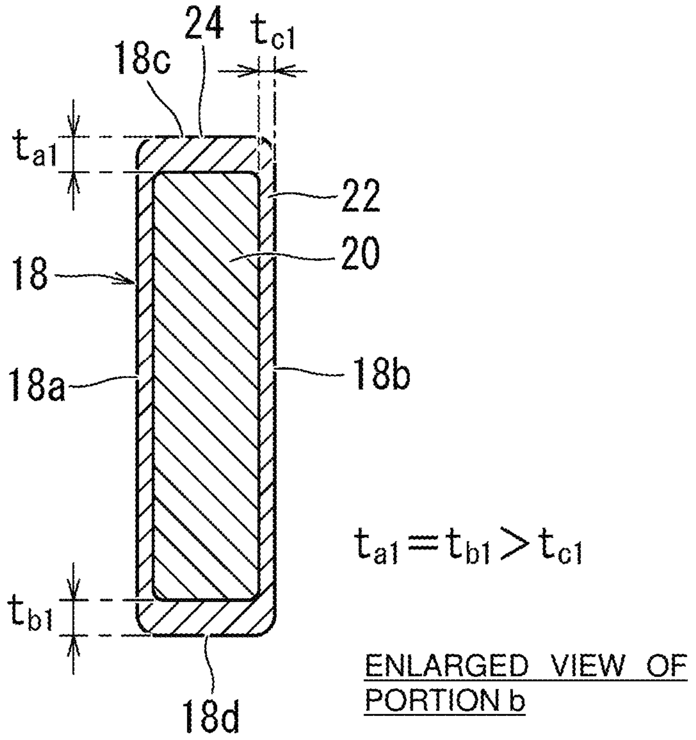
FIG. 7 is an enlarged sectional view of another example of portion b in FIG. 5.

As shown in FIG. 7, at the substantially rectangular wire 20, the average thickness $t_{a1}$ of the portion of the insulating film 22 that covers the side end surfaces 18*c* facing the first principal surface 12*a* and extending in the direction orthogonal to the winding axis O of the coil conductor 16 and the average thickness $t_{b1}$ of the portion of the insulating film 22 that covers the side end surfaces 18*d* facing the second principal surface 12*b* and extending in the direction orthogonal to the winding axis O of the coil conductor 16 are greater than the average thickness of the portions of the insulating film 22 that cover the other surfaces of the substantially rectangular wire 20, that is, the average thickness $t_{c1}$ of the portions of the insulating film 22 that cover the plate surfaces 18*a* and the plate surfaces 18*b*. Here, the relationship between the average thicknesses of the portions of the insulating film 22 desirably satisfies $t_{a1}=t_{b1}>t_{c1}$. The average thickness $t_{a1}$ of the insulating film 22 and the average thickness $t_{b1}$ of the insulating film 22 are desirably about 4 μm or greater and about 20 μm or less (i.e., from about 4 μm to about 20 μm), and the average thickness $t_{c1}$ of the insulating film 22 is desirably about 1 μm or greater and about 10 μm or less (i.e., from about 1 μm to about 10 μm). When the particle size of the average particle size D50 of the second metal magnetic-body particles is D, the average thickness $t_{a1}$ and the average thickness $t_{b1}$ of the insulating film 22 desirably satisfy the relationship of $D<t_{a1}$ and the relationship $D<t_{b1}$.

As shown in FIG. 8, the first principal surface 16*a* and the second principal surface 16*b* of the coil conductor 16 may be covered with a coil insulating film 24.

At the coil conductor 16, an average thickness $t_A$ of a portion of the coil insulating film 24 that covers the first principal surface 16*a* of the coil conductor 16 facing the first principal surface 12*a* and extending in a direction orthogonal to the winding axis O of the coil conductor 16 and an average thickness $t_B$ of a portion of the coil insulating film 24 that covers the second principal surface 16*b* of the coil conductor 16 facing the second principal surface 12*b* and extending in the direction orthogonal to the winding axis O of the coil conductor 16 are desirably about 1 μm or greater and about 20 μm or less (i.e., from about 1 μm to about 20 μm). In this case, the average thickness of the insulating film 22 that covers the substantially rectangular wire 20 may be a substantially uniform thickness. Therefore, an average thickness $t_A+t_{a1}$ of a portion of the insulating film that forms the first principal surface 16*a* of the coil conductor 16 extending in the direction orthogonal to the winding axis O of the coil conductor 16 and an average thickness $t_B+t_{b1}$ of a portion of the insulating film that forms the second principal surface 16*b* of the coil conductor 16 extending in the direction orthogonal to the winding axis O of the coil conductor 16 are larger than the average thickness of the portions of the insulating film that cover the first side surface 16*c* and the second side surface 16*d* of the coil conductor 16 (that is, the average thickness $t_{c1}$ of the portions of the insulating film that cover the plate surfaces 18*a* and the plate surfaces 18*b* of the substantially rectangular wire 20). The average thickness $t_A+t_{a1}$ of the portion of the insulating film that forms the first principal surface 16*a* of the coil conductor 16 extending in the direction orthogonal to the winding axis O of the coil conductor 16 and the average thickness $t_B+t_{b1}$ of the portion of the insulating film that forms the second principal surface 16*b* of the coil conductor 16 extending in the direction orthogonal to the winding axis O of the coil conductor 16 are about 5 μm or greater and about 40 μm or less (i.e., from about 5 μm to about 40 μm).

Further, as shown in FIG. 9, the first principal surface 16*a* and the second principal surface 16*b* of the coil conductor 16, and the first side surface 16*c* and the second side surface 16*d* of the coil conductor 16 may be covered with the coil insulating film 24.

The average thickness $t_A$ of the portion of the coil insulating film 24 that covers the first principal surface 16*a* of the coil conductor 16 facing the first principal surface 12*a* and extending in the direction orthogonal to the winding axis O of the coil conductor 16 and the average thickness $t_B$ of the portion of the coil insulating film 24 that covers the second principal surface 16*b* of the coil conductor 16 facing the second principal surface 12*b* and extending in the direction orthogonal to the winding axis O of the coil conductor 16 are desirably larger than the average thickness of a portion of the coil insulating film 24 that covers the other surface of the coil conductor 16, that is, an average thickness $t_C$ of the portions of the coil insulating film 24 that cover the first side surface 16*c* and the second side surface 16*d* of the coil conductor 16. In this case, the average thickness of the insulating film 22 that covers the substantially rectangular wire 20 may be a substantially uniform thickness. Therefore, the average thickness $t_A+t_{a1}$ of the portion of the insulating film that forms the first principal surface 16*a* of the coil conductor 16 extending in the direction orthogonal to the winding axis O of the coil conductor 16 and the average thickness $t_B+t_{b1}$ of the portion of the insulating film that forms the second principal surface 16*b* of the coil conductor 16 extending in the direction orthogonal to the winding axis O of the coil conductor 16 are larger than an average thickness $t_C+t_{c1}$ of the portions of the insulating film that form the first side surface 16*c* and the second side surface 16*d* of the coil conductor 16. The average thickness $t_A+t_{a1}$ of the portion of the insulating film that forms the first principal surface 16*a* of the coil conductor 16 extending in the direction orthogonal to the winding axis O of the coil conductor 16 and the average thickness $t_B+t_{b1}$ of the portion of the insulating film that forms the second principal surface 16*b* of the coil conductor 16 extending in the direction orthogonal to the winding axis O of the coil conductor 16 are about 5 μm or greater and about 40 μm or less (i.e., from about 5 μm to about 40 μm).

The insulating film 22 may have two or more layers. In particular, the portion of the insulating film 22 that covers the side end surfaces 18*c* facing the first principal surface 12*a* and extending in the direction orthogonal to the winding axis O of the coil conductor 16 desirably has two or more layers.

In addition, at the substantially rectangular wire 20, the portion of the insulating film 22 that covers the side end surfaces 18*c* facing the first principal surface 12*a* and extending in the direction orthogonal to the winding axis O of the coil conductor 16 and the portion of the insulating film 22 that covers the side end surfaces 18*d* facing the second principal surface 12*b* and extending in the direction orthogonal to the winding axis O of the coil conductor 16 desirably have two or more layers.

This makes it possible to make it less likely for the magnetic-body particles to pierce through the insulating film 22. By forming the portions of the insulating film 22 having two or more layers with different compositions, it is possible to improve the insulating properties of the coil conductor 16, increase the mechanical strength of the coil conductor 16, and increase the ability to join the portions of the substantially rectangular wire 20 to each other.

Further, at the insulating film 22 having two or more layers, an outer layer is desirably covered with a thermal adhesion layer, which is a layer having thermal adhesiveness. Therefore, when the conductive belt body 18 is wound, the portions of the conductive belt body 18 are joined to each other, and thus it is possible to increase the joining strength between the portions of the conductive belt body 18 and to increase the ability to maintain the shape of the coil conductor 16.

It is desirable that the insulating film 22 not be disposed at exposed portions (exposed surfaces) at the end surfaces 12*e* and 12*f* of the body 12, where the first exposed portion 34*a* and the second exposed portion 34*b* are respectively disposed at the conductive belt body 18 of the coil conductor 16. Therefore, the coil conductor 16 and the external electrodes 40 can be directly electrically connected to each other, and thus it is possible to reduce electrical resistance between the coil conductor 16 and each external electrode 40.

Further, at the metal magnetic-body particles that are in contact with the external electrodes 40, the average thickness of the insulating film that is in contact with the external electrodes 40 is desirably smaller than the average thickness of the insulating film that is not in contact with the external electrodes 40. Therefore, when the external electrodes 40 are formed by plating, it is possible to pass current in a concentrated manner through the metal magnetic-body particles that are positioned near the first extended portion 32*a* and the second extended portion 32*b* of the coil conductor 16, which are respectively exposed at the first end surface 12*e* and the second end surface 12*f* of the body 12, and to further perform the film plating.

(D) External Electrodes

The external electrodes 40 are each disposed on a corresponding one of a side of the first end surface 12*e* and a side of the second end surface 12*f* of the body 12. The external electrodes 40 include a first external electrode 40*a* and a second external electrode 40*b*.

The first external electrode 40*a* is disposed on the first end surface 12*e* of the body 12. Note that the first external electrode 40*a* may be formed so as to extend from the first end surface 12*e* and cover a part of the first principal surface 12*a*, a part of the second principal surface 12*b*, a part of the first side surface 12*c*, and a part of the second side surface 12*d*, or may be formed so as to extend from the first end surface 12*e* to the second principal surface 12*b* and cover a part of the first end surface 12*e* and a part of the second principal surface 12*b*. In this case, the first external electrode 40*a* is electrically connected to the first extended portion 32*a* of the coil conductor 16.

The second external electrode 40*b* is disposed on the second end surface 12*f* of the body 12. Note that the second external electrode 40*b* may be formed so as to extend from the second end surface 12*f* and cover a part of the first principal surface 12*a*, a part of the second principal surface 12*b*, a part of the first side surface 12*c*, and a part of the second side surface 12*d*, or may be formed so as to extend from the second end surface 12*f* to the second principal surface 12*b* and cover a part of the second end surface 12*f* and a part of the second principal surface 12*b*. In this case, the second external electrode 40*b* is electrically connected to the second extended portion 32*b* of the coil conductor 16.

Although the thickness of the first external electrode 40*a* and the thickness of the second external electrode 40*b* are not particularly limited to certain thicknesses, the thickness of the first external electrode 40*a* and the thickness of the second external electrode 40*b* may be, for example, about 1 μm or greater and about 50 μm or less (i.e., from about 1 μm to about 50 μm) and desirably about 5 μm or greater and about 20 μm or less (i.e., from about 5 μm to about 20 μm).

The first external electrode 40*a* includes a first underlying electrode layer 42*a* and a first plating layer 44*a* that is disposed on a surface of the first underlying electrode layer 42*a*. Similarly, the second external electrode 40*b* includes a second underlying electrode layer 42*b* and a second plating layer 44*b* that is disposed on a surface of the second underlying electrode layer 42*b*.

The first underlying electrode layer 42*a* is disposed on the first end surface 12*e* of the body 12. Therefore, the first underlying electrode layer 42*a* is directly in contact with the first exposed portion 34*a* of the coil conductor 16. Note that the first underlying electrode layer 42*a* may be formed so as to extend from the first end surface 12*e* and cover a part of the first principal surface 12*a*, a part of the second principal surface 12*b*, a part of the first side surface 12*c*, and a part of the second side surface 12*d*, or may be formed so as to extend from the first end surface 12*e* and cover a part of the first end surface 12*e* and a part of the second principal surface 12*b*.

The second underlying electrode layer 42*b* is disposed on the second end surface 12*f* of the body 12. Therefore, the second underlying electrode layer 42*b* is directly in contact with the second exposed portion 34*b* of the coil conductor 16. Note that the second underlying electrode layer 42*b* may be formed so as to extend from the second end surface 12*f* and cover a part of the first principal surface 12*a*, a part of the second principal surface 12*b*, a part of the first side surface 12*c*, and a part of the second side surface 12*d*, or may be formed so as to extend from the second end surface 12*f* and cover a part of the second end surface 12*f* and a part of the second principal surface 12*b*.

The first underlying electrode layer 42*a* and the second underlying electrode layer 42*b* are made of a conductive material, desirably, one or more types of metal materials selected from Au, Ag, Pd, Ni, and Cu. The first underlying electrode layer 42*a* and the second underlying electrode layer 42*b* are each formed as a plating electrode. The first underlying electrode layer 42*a* and the second underlying electrode layer 42*b* may be formed by electrolytic plating or electroless plating.

The compositions of the main components of the metal materials constituting the first underlying electrode layer 42*a* and the second underlying electrode layer 42*b* are desirably the same as the composition of the main components of the metal material constituting the coil conductor 16.

The average thickness of the first underlying electrode layer 42*a* and the average thickness of the second underlying electrode layer 42*b* are, for example, about 10 μm.

The first plating layer 44*a* is disposed so as to cover the first underlying electrode layer 42*a*. Specifically, the first plating layer 44*a* may be disposed so as to cover the first underlying electrode layer 42*a* that is disposed on the first end surface 12*e* and may further be disposed so as to extend from the first end surface 12*e* and cover a surface of the first underlying electrode layer 42*a*, at which the first principal surface 12*a*, the second principal surface 12*b*, the first side surface 12*c*, and the second side surface 12*d* are disposed, or may be disposed so as to cover the first underlying electrode layer 42*a* that is disposed so as to extend from the first end surface 12*e* and cover a part of the first end surface 12*e* and a part of the second principal surface 12*b*.

The second plating layer 44*b* is disposed so as to cover the second underlying electrode layer 42*b*. Specifically, the second plating layer 44*b* may be disposed so as to cover the second underlying electrode layer 42*b* that is disposed on the second end surface 12*f* and may further be disposed so as to extend from the second end surface 12*f* and cover a surface of the second underlying electrode layer 42*b*, at which the first principal surface 12*a*, the second principal surface 12*b*, the first side surface 12*c*, and the second side surface 12*d* are disposed, or may further be disposed so as to cover the second underlying electrode layer 42*b* that is disposed so as to extend from the second end surface 12*f* and cover a part of the second end surface 12*f* and a part of the second principal surface 12*b*.

As metal materials of the first plating layer 44*a* and the second plating layer 44*b*, for example, at least one substance is selected from Cu, Ni, Ag, Sn, Pd, a Ag—Pd alloy, and Au.

The first plating layer 44*a* and the second plating layer 44*b* may each have a plurality of layers.

The first plating layer 44*a* has a two-layer structure including a first Ni plating layer 46*a* and a first Sn plating layer 48*a* that is formed on a surface of the first Ni plating layer 46*a*. The second plating layer 44*b* has a two-layer structure including a second Ni plating layer 46*b* and a second Sn plating layer 48*b* that is formed on a surface of the second Ni plating layer 46*b*.

The average thickness of the first Ni plating layer 46*a* and the average thickness of the second Ni plating layer 46*b* are, for example, about 5 μm.

The average thickness of the first Sn plating layer 48*a* and the average thickness of the second Sn plating layer 48*b* are, for example, about 10 μm.

Note that the first external electrode 40*a* and the second external electrode 40*b* may be provided with a structure such as that described below.

For example, the first underlying electrode layer 42*a* and the second underlying electrode layer 42*b* may each be a resin electrode containing Ag, and may include an Ag sputter layer, a Cu sputter layer, or a Ti sputter layer, which are formed by sputtering. Note that when the first underlying electrode layer 42*a* and the second underlying electrode layer 42*b* are each a resin electrode containing Ag, they may each contain a glass frit. When the first underlying electrode layer 42*a* and the second underlying electrode layer 42*b* are formed by sputtering, the Cu sputter layer may be formed on the Ti sputter layer.

The first plating layer 44*a* and the second plating layer 44*b* may be such that their outermost layers are constituted by only the Sn plating layer 48*a* and the Sn plating layer 48*b*, respectively.

Further, an Ag plating layer or a Ni plating layer may be formed on the body 12 without forming the first underlying electrode layer 42*a* and the second underlying electrode layer 42*b*.

(E) Protective Layer

In the embodiment, a protective layer 50 is provided on a surface of the body 12 excluding a portion where the first exposed portion 34*a* is exposed at the first end surface 12*e* of the body 12 and a portion where the second exposed portion 34*b* is exposed at the second end surface 12*f* of the body 12. The protective layer 50 is made of, for example, a resin material having a high electrical insulation performance, such as acrylic resin, epoxy resin, phenol resin, or polyimide resin. Note that, although in the present disclosure, the protective layer 50 is provided, the protective layer 50 need not be provided.

When a dimension in the length direction z of the coil component 10 is a dimension L, the dimension L is desirably about 1.0 mm or greater and about 12.0 mm or less (i.e., from about 1.0 mm to about 12.0 mm). When a dimension in the width direction y of the coil component 10 is a dimension W, the dimension W is desirably about 0.5 mm or greater and about 12.0 mm or less (i.e., from about 0.5 mm to about 12.0 mm). When a dimension in the pressing direction x of the coil component 10 is a dimension T, the dimension T is about 0.5 mm or greater and about 6.0 mm or less (i.e., from about 0.5 mm to about 6.0 mm).

At the substantially rectangular wire 20, since the average thickness $t_{a1}$ of the portion of the insulating film 22 that covers the side end surfaces 18*c* facing the first principal surface 12*a* and extending in the direction orthogonal to the winding axis O of the coil conductor 16 is larger than the average thicknesses of the portions of the insulating film 22 that cover the other surfaces of the substantially rectangular wire 20, that is, the average thickness $t_{c1}$ of the portions of the insulating film 22 that covers the plate surfaces 18*a* and the plate surfaces 18*b*, and the average thickness $t_{b1}$ of the portion of the insulating film 22 that covers the side end surface 18*d*, the coil component 10 shown in FIG. 1 has increased impact resistance, and thus is capable of suppressing occurrence of short-circuit defects that occur when magnetic-body particles pierce through the insulating film 22. In such a coil component according to the present disclosure, since it is possible to increase the molding pressure in compression molding, it is possible to increase the ability to fill with the magnetic-body particles and to thus improve the efficiency with which inductance is obtained.

Compared with when the insulating film 22 on the entire substantially rectangular wire 20 is thick, it is possible to reduce the volume of the magnetic-body section 14 and to suppress a reduction in magnetic permeability.

Next, a coil component 110 according to a second embodiment of the present disclosure is described.

Figure 10:
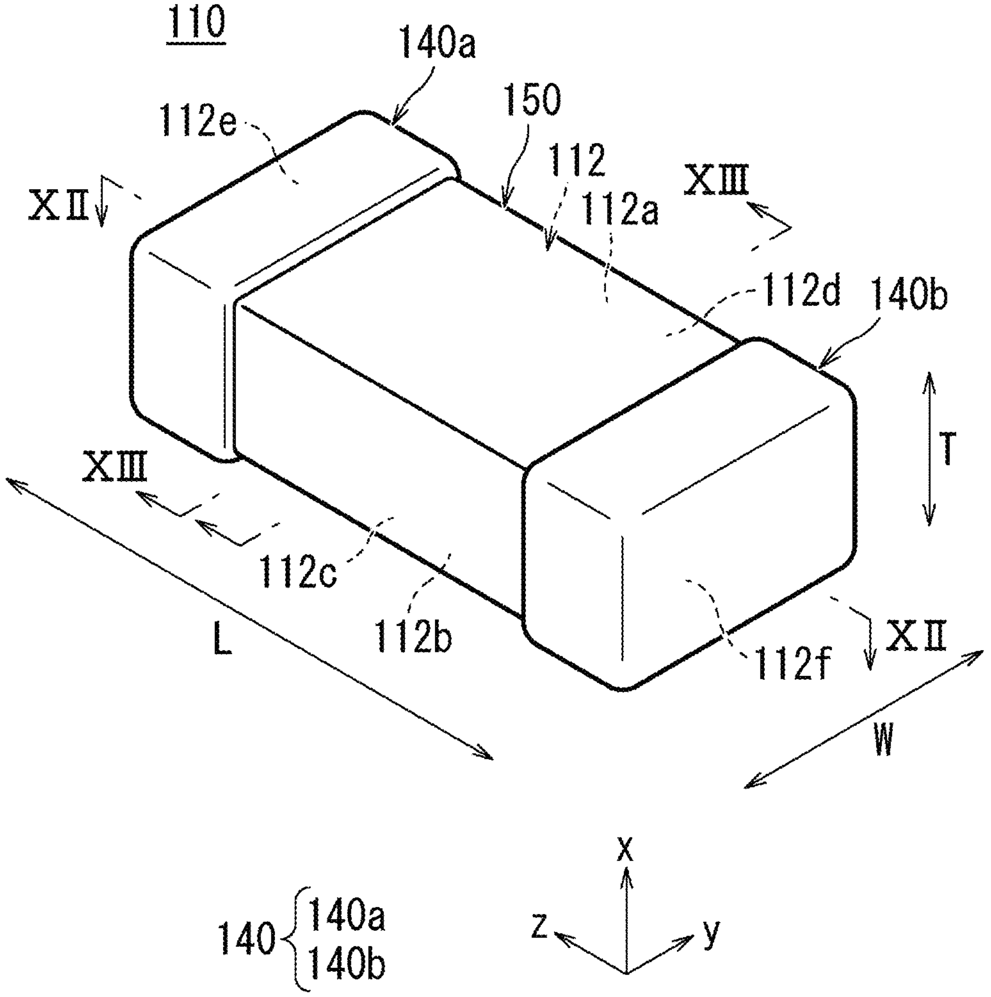
FIG. 10 is an external perspective view schematically illustrating a coil component according to a second embodiment of the present disclosure.
Figure 11:
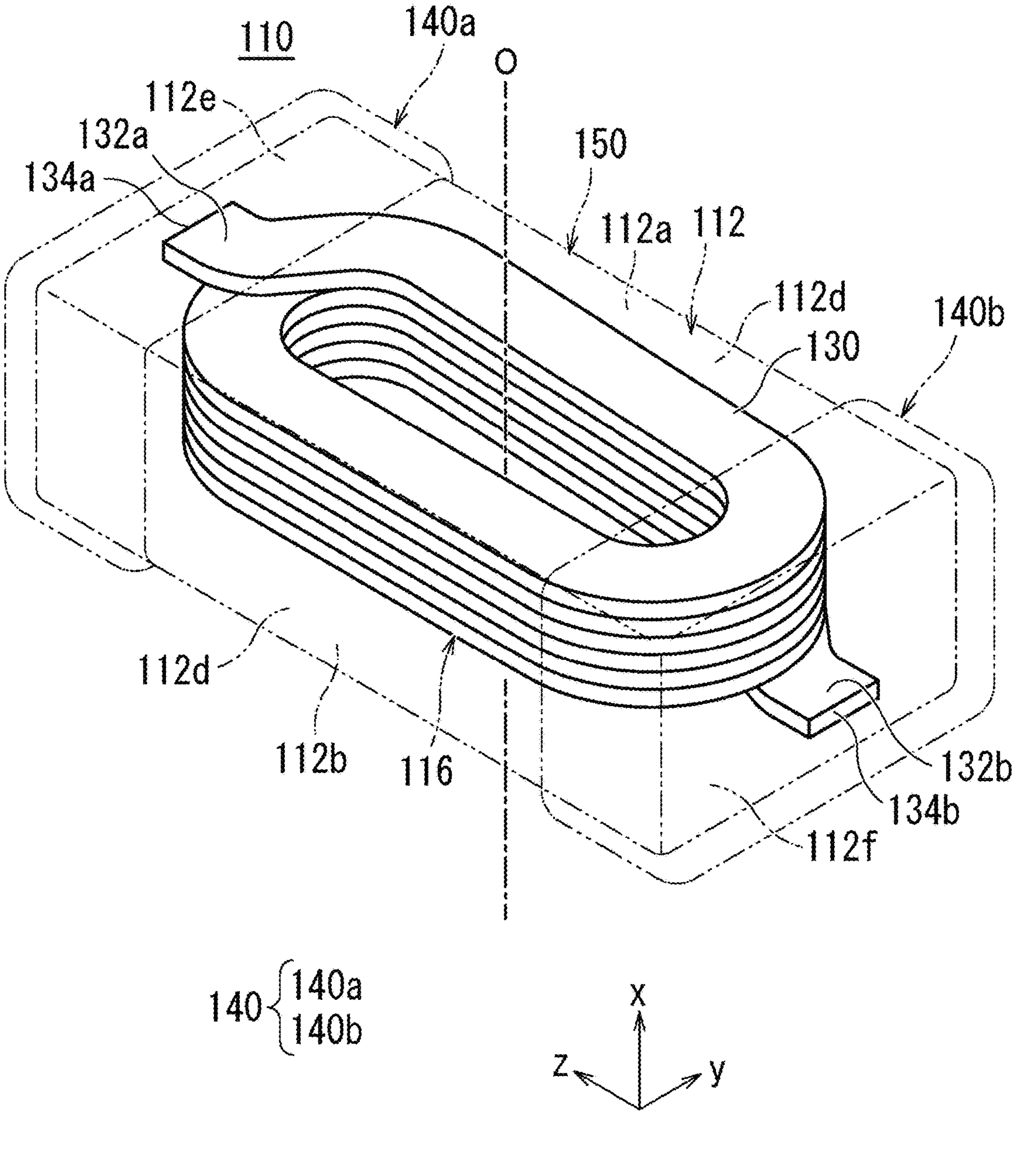
FIG. 11 is a transparent, perspective view of a magnetic-body section having a coil conductor buried therein in the coil component shown in FIG. 10.
Figure 12:
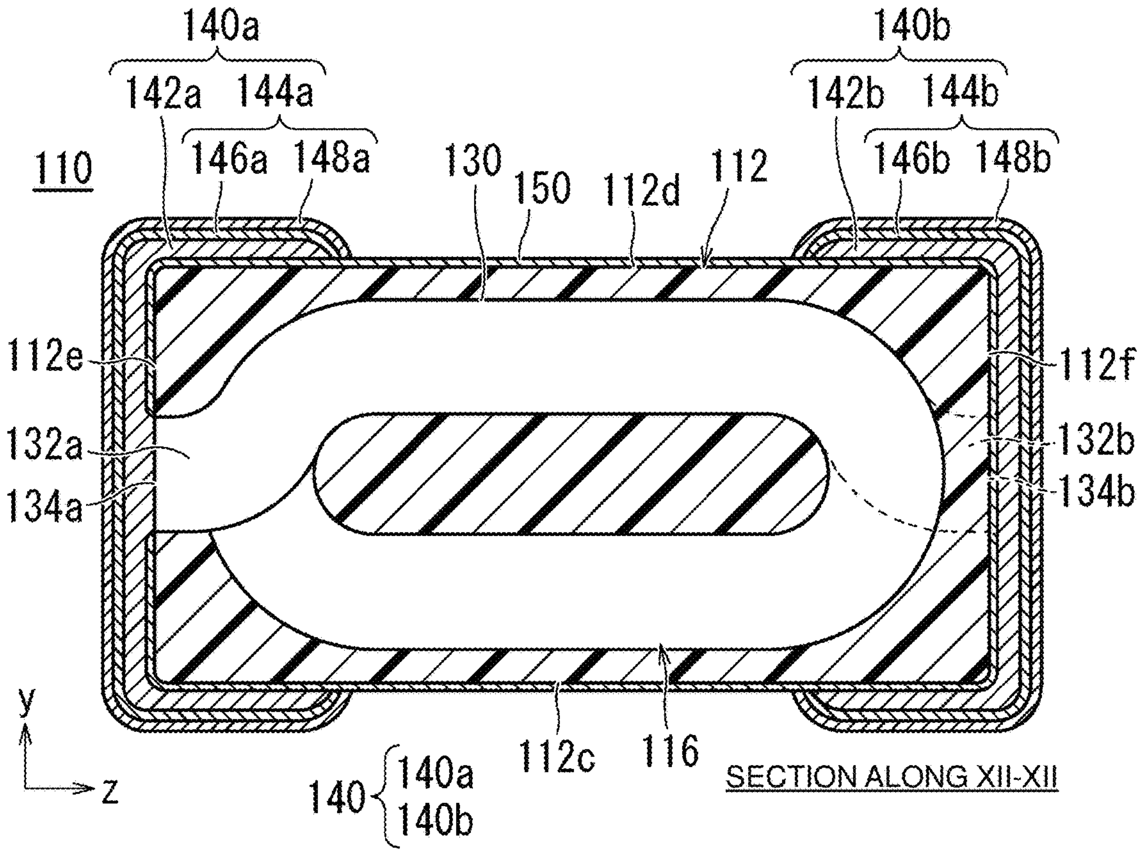
FIG. 12 is a sectional view along line XII-XII in FIG. 10.
Figure 13:
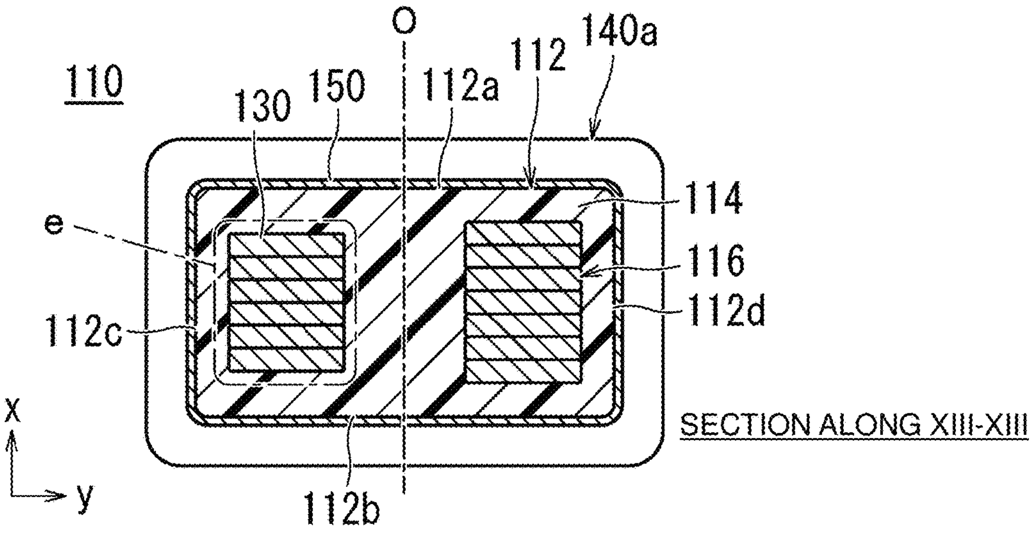
FIG. 13 is a sectional view along line XIII-XIII in FIG. 10.
Figure 14:
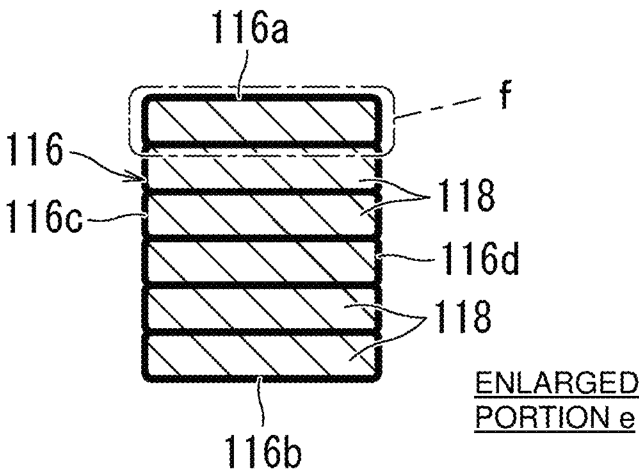
FIG. 14 is an enlarged sectional view of a portion e in FIG. 13.

FIG. 10 is an external perspective view schematically illustrating the coil component according to the second embodiment of the present disclosure. FIG. 11 is a transparent, perspective view of a magnetic-body section having a coil conductor buried therein in the coil component shown in FIG. 10. FIG. 12 is a sectional view along line XII-XII in FIG. 10. FIG. 13 is a sectional view along line XIII-XIII in FIG. 10. FIG. 14 is an enlarged sectional view of a portion e in FIG. 13.

A body 112 includes a magnetic-body section 114 and a coil conductor 116 that is buried in the magnetic-body section 114. The body 112 includes a first principal surface 112*a* and a second principal surface 112*b* that face each other in a height direction x, a first side surface 112*c* and a second side surface 112*d* that face each other in the width direction y that is orthogonal to the height direction x, and a first end surface 112*e* and a second end surface 112*f* that face each other in the length direction z that is orthogonal to the height direction x and the width direction y.

The coil conductor 116 includes a winding portion 130 that is formed by winding in the form of a coil a conductive belt body 118, which is one type of coil wire rod, and a first extended portion 132*a* and a second extended portion 132*b*. The first extended portion 132*a* is extended to one side of the winding portion 130 and the second extended portion 132*b* is extended to the other side of the winding portion 130. The coil conductor 116 is formed by winding the conductive belt body 118 into a substantially alpha shape. The conductive belt body 118 is wound in the form of an edgewise coil.

The first extended portion 132*a* is exposed from the first end surface 112*e* of the body 112 to dispose a first exposed portion 134*a*, and the second extended portion 132*b* is exposed from the second end surface 112*f* of the body 112 to dispose a second exposed portion 134*b*.

The conductive belt body 118 includes plate surfaces 118*a* and plate surfaces 118*b* that face each other, and side end surfaces 118*c* and side end surfaces 118*d* that face each other. The conductive belt body 118 includes a substantially linear rectangular wire 120 that is substantially rectangular in cross section, and an insulating film 122 that covers a surface of the substantially rectangular wire 120.

In the conductive belt body 118 of the coil conductor 116, the plate surfaces 118*a* face the first principal surface 112*a* of the body 112, and the plate surfaces 118*b* face the second principal surface 112*b* of the body 112.

As shown in FIG. 14, the coil conductor 116 includes a first principal surface 116*a* of the coil conductor 116 that is formed from the plate surfaces 118*a*, a second principal surface 116*b* of the coil conductor 116 that is formed from the plate surfaces 118*b*, a first side surface 116*c* of the coil conductor 116 that is formed from the plurality of side end surfaces 118*c*, and a second side surface 116*d* of the coil conductor 116 that is formed from the plurality of side end surfaces 118*d*.

The first principal surface 116*a* of the coil conductor 116 faces the first principal surface 112*a* of the body 112, and the second principal surface 116*b* of the coil conductor 116 faces the second principal surface 112*b* of the body 112.

As shown in FIG. 11, the winding portion 130 of the coil conductor 116 is wound around a winding axis O as a center. The coil conductor 116 is wound so that the plate surfaces 118*a* and the plate surfaces 118*b* overlap each other with the plate surfaces 118*a* and the plate surfaces 118*b* of the conductive belt body 118 being substantially perpendicular to the winding axis O and the side end surfaces 118*c* and the side end surfaces 118*d* of the conductive belt body 118 being substantially parallel to the winding axis O. Note that, although, in FIG. 11, the coil conductor 116 is wound in a substantially elliptical form, the coil conductor 116 may be wound in a circular form.

For example, the width of the substantially rectangular wire 120 at the side end surfaces 118*c* and the side end surfaces 118*d* is about 15 μm or greater and about 200 μm or less (i.e., from about 15 μm to about 200 μm), and the width of the substantially rectangular wire 120 at the plate surfaces 118*a* and 118*b* is about 50 μm or greater and about 500 μm or less (i.e., from about 50 μm to about 500 μm).

The substantially rectangular wire 120 of the conductive belt body 118 is formed from, for example, a metal wire or a wire. Although the conductive material of the substantially rectangular wire 120 is not particularly limited to certain conductive materials, examples thereof include metal components including Ag, Au, Cu, Ni, Sn, and an alloy thereof. As the conductive material, copper is desirably used. As the conductive material, only one type of such substances above or two or more types of such substances above may be used.

A surface of the substantially rectangular wire 120 is covered with an insulating substance to form the insulating film 122. By covering the substantially rectangular wire 120 with an insulating substance, it is possible to more reliably insulate portions of the wound conductive belt body 118 from each other and more reliably insulate the conductive belt body 118 and the magnetic-body section 114 from each other.

Note that the insulating film 122 is not formed at a portion of each of the first exposed portion 134*a* and the second exposed portion 134*b* of the conductive belt body 118 that forms the coil conductor 116. Therefore, external electrodes 140 are easily formed by plating. In addition, it is possible to further reduce the resistance at an electrical connection between the coil conductor 116 and the external electrodes 140.

Although the insulating substance of the insulating film 122 is not particularly limited to certain insulating substances, the insulating substance is at least one type selected from, for example, polyimide resin, polyamide resin, polyurethane resin, polyamide-imide resin, polyester resin, and enamel resin.

Figure 15:
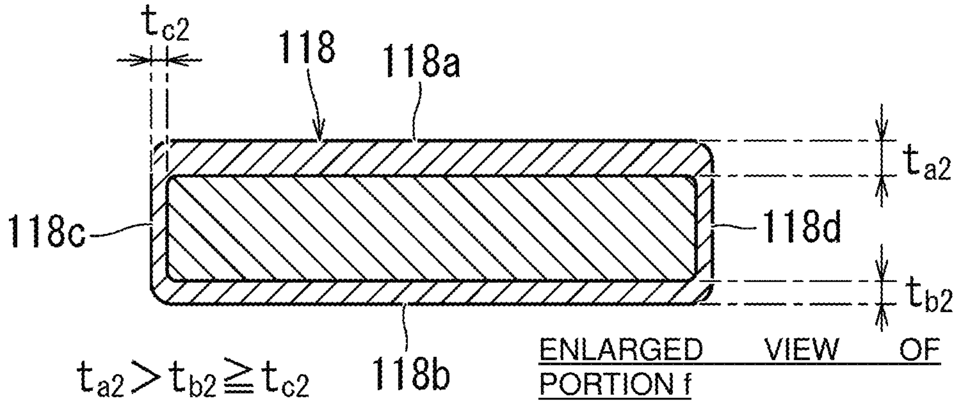
FIG. 15 is an enlarged sectional view of a portion fin FIG. 14.

As shown in FIG. 15, at the substantially rectangular wire 120, an average thickness $t_{a2}$ of a portion of the insulating film 122 that covers the plate surfaces 118*a* facing the first principal surface 112*a* and extending in a direction orthogonal to the winding axis O of the coil conductor 116 is larger than an average thickness $t_{b2}$ of a portion of the insulating film 122 that covers the plate surfaces 118*b* facing the second principal surface 112*b* and extending in the direction orthogonal to the winding axis O of the coil conductor 116. Here, the relationship between the average thicknesses of the portions of the insulating film 122 satisfies $t_{a2}>t_{b2}\geq t_{c2}$. The average thickness $t_{a2}$ of the insulating film 122 is desirably about 4 μm or greater and 20 μm or less (i.e., from about 4 μm to 20 μm), and the average thickness $t_{b2}$ of the insulating film 122 and the average thickness $t_{c2}$ of the insulating film 122 are desirably about 1 μm or greater and 10 μm or less (i.e., from about 1 μm to 10 μm). Here, when the particle size of the average particle size D50 of second metal magnetic-body particles is D, the average thickness $t_{a2}$ of the insulating film 122 desirably satisfy the relationship of $D<t_{a2}$.

Figure 16:
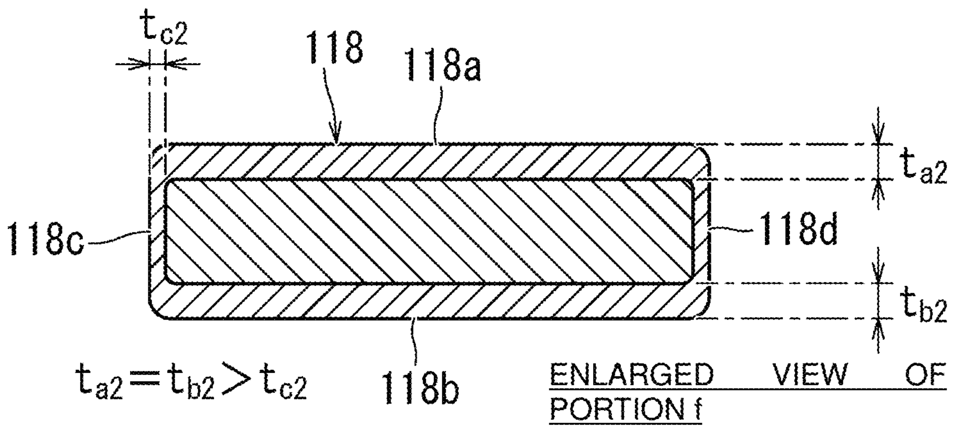
FIG. 16 is an enlarged sectional view of another example of portion fin FIG. 14.

As shown in FIG. 16, at the substantially rectangular wire 120, the average thickness $t_{a2}$ of the portion of the insulating film 122 that covers the plate surfaces 118*a* facing the first principal surface 112*a* and extending in the direction orthogonal to the winding axis O of the coil conductor 116 and the average thickness $t_{b2}$ of the portion of the insulating film 122 that covers the plate surfaces 118*b* facing the second principal surface 112*b* and extending in the direction orthogonal to the winding axis O of the coil conductor 116 are desirably larger than the average thickness of portions of the insulating film 122 that cover the other surfaces of the substantially rectangular wire 120, that is, the average thickness $t_{c2}$ of the portions of the insulating film 122 that cover the side end surfaces 118*c* and the side end surfaces 118*d*. Here, the relationship between the average thicknesses of the portions of the insulating film 122 desirably satisfies $t_{a2}=t_{b2}>t_{c2}$. The average thickness $t_{a2}$ of the insulating film 122 and the average thickness $t_{b2}$ of the insulating film 122 are desirably about 4 μm or greater and about 20 μm or less (i.e., from about 4 μm to about 20 μm), and the average thickness $t_{c2}$ of the insulating film 122 is desirably about 1 μm or greater and about 10 μm or less (i.e., from about 1 μm to about 10 μm). When the particle size of the average particle size D50 of the second metal magnetic-body particles is D, it is desirable that the average thickness $t_{a2}$ of the insulating film 122 and the average thickness $t_{b2}$ of the insulating film 122 desirably satisfy the relationship of $D<t_{a2}$ and the relationship $D<t_{b2}$, respectively.

The insulating film 122 may have two or more layers. In particular, the portion of the insulating film 122 that covers the plate surfaces 118*a* facing the first principal surface 112*a* and extending in the direction orthogonal to the winding axis O of the coil conductor 116 desirably has two or more layers.

In addition, at the substantially rectangular wire 120, the portion of the insulating film 122 that covers the plate surfaces 118*a* facing the first principal surface 112*a* and extending in the direction orthogonal to the winding axis O of the coil conductor 116 and the portion of the insulating film 122 that covers the plate surfaces 118*b* facing the second principal surface 112*b* and extending in the direction orthogonal to the winding axis O of the coil conductor 116 desirably have two or more layers.

Further, at the insulating film 122 having two or more layers, an outer layer is desirably covered with a thermal adhesion layer, which is a layer having thermal adhesiveness. Therefore, when the conductive belt body 118 is wound, the portions of the conductive belt body 118 are joined to each other, and thus it is possible to increase the joining strength between the portions of the conductive belt body 118 and to increase the ability to maintain the shape of the coil conductor 116.

When, as shown in FIG. 12, the first extended portion 132*a* of the coil conductor 116 is exposed from the first principal surface 112*a*, a first external electrode 140*a* is formed so as to cover a part of the first principal surface 112*a*. In this case, the first external electrode 140*a* is electrically connected to the first extended portion 132*a* of the coil conductor 116.

When, as shown in FIG. 12, the second extended portion 132*b* of the coil conductor 116 is exposed from the first principal surface 112*a*, a second external electrode 140*b* is formed so as to cover a part of the first principal surface 112*a*. In this case, the second external electrode 140*b* is electrically connected to the second extended portion 132*b* of the coil conductor 116.

The first external electrode 140*a* includes a first underlying electrode layer 142*a* and a first plating layer 144*a* that is disposed on a surface of the first underlying electrode layer 142*a*. Similarly, the second external electrode 140*b* includes a second underlying electrode layer 142*b* and a second plating layer 144*b* that is disposed on a surface of the second underlying electrode layer 142*b*.

As shown in FIG. 12, when the coil conductor 116 is such that the first extended portion 132*a* of the coil conductor 116 is exposed from the first principal surface 112*a*, the first underlying electrode layer 142*a* is formed on a part of the first principal surface 112*a* so as to cover the first extended portion 132*a* of the coil conductor 116.

As shown in FIG. 12, when the second extended portion 132*b* of the coil conductor 116 is exposed from the first principal surface 112*a*, the second underlying electrode layer 142*b* is formed on a part of the first principal surface 112*a* so as to cover the second extended portion 132*b* of the coil conductor 116.

Here, the first underlying electrode layer 142*a* and the second underlying electrode layer 142*b* are formed from a plurality of crystal particles. The particle size of the crystal particles of the first underlying electrode layer 142*a* and the second underlying electrode layer 142*b* is desirably about 100 nm or greater and about 2000 nm or less (i.e., from about 100 nm to about 2000 nm).

As shown in FIG. 12, when the first extended portion 132*a* of the coil conductor 116 is exposed from the first principal surface 112*a*, the first plating layer 144*a* is formed so as to cover the first underlying electrode layer 142*a* that is disposed on the first principal surface 112*a*.

As shown in FIG. 12, when the second extended portion 132*b* of the coil conductor 116 is exposed from the first principal surface 112*a*, the second plating layer 144*b* is formed so as to cover the second underlying electrode layer 142*b* that is disposed on the first principal surface 112*a*.

The first plating layer 144*a* and the second plating layer 144*b* may each have a plurality of layers.

The first plating layer 144*a* has a two-layer structure including a first Ni plating layer 146*a* and a first Sn plating layer 148*a* that is formed on a surface of the first Ni plating layer 146*a*. The second plating layer 144*b* has a two-layer structure including a second Ni plating layer 146*b* and a second Sn plating layer 148*b* that is formed on a surface of the second Ni plating layer 146*b*.

The average thickness of the first Ni plating layer 146*a* and the average thickness of the second Ni plating layer 146*b* are, for example, about 5 μm.

The average thickness of the first Sn plating layer 148*a* and the average thickness of the second Sn plating layer 148*b* are, for example, about 10 μm.

The coil component 110 shown in FIG. 10 provides the same effects as those provided by the coil component 10 shown in FIG. 1.

2. Method of Manufacturing Coil Component

Next, a method of manufacturing a coil component is described.

(A) Preparation of Metal Magnetic-Body Particles

First, metal magnetic-body particles are prepared. Here, the metal magnetic-body particles are not particularly limited to certain particles, and may be, for example, a soft-magnetic-material powder based on Fe, such as α-Fe, Fe—Si, Fe—Si—Cr, Fe—Si—Al, Fe—Ni, or Fe—Co. The material form of the metal magnetic-body particles is desirably an amorphous material having good soft magnetic properties, but is not particularly limited to certain material forms, and may be a crystalline material.

Although the average particle size of the metal magnetic-body particles is not particularly limited to certain average particle sizes, it is desirable to use metal magnetic-body particles having two or more different average particle sizes. That is, the metal magnetic-body particles are dispersed in a resin material. Therefore, from the viewpoint of increasing the filling efficiency of the metal magnetic-body particles, it is desirable to use metal magnetic-body particles having different average particle sizes, such as first metal magnetic-body particles having an average particle size of about 10 μm or greater and about 40 μm or less (i.e., from about 10 μm to about 40 μm) and second metal magnetic-body particles having an average particle size of about 1 μm or greater and about 20 μm or less (i.e., from about 1 μm to about 20 μm).

(B) Formation of Insulating Film

Next, the surfaces of the metal magnetic-body particles are covered with an insulating film. Here, when the insulating film is to be formed by a mechanical method, it is possible to put the metal magnetic-body particles and an insulating-material powder into a rotating container, combine the particles by mechano-chemical treatment, and thereby cover the surfaces of magnetic-body powder with the insulating film.

(C) Fabrication of Magnetic-Body Sheet

Next, the resin material is prepared. The resin material is not particularly limited to certain resin materials, and can be, for example, epoxy resin, phenol resin, polyester resin, polyimide resin, or a polyolefin resin.

Next, the metal magnetic-body particles covered with the insulating film and a filler component (a glass material, ceramic powder, ferrite powder, or the like) is mixed with the resin material into the form of a slurry. Next, the slurry is formed by, for example, a doctor blade method and is then dried, to thereby fabricate a magnetic-body sheet having the filler component dispersed in the resin material and having a thickness of about 50 μm or greater and about 300 μm or less (i.e., from about 50 μm to about 300 μm).

(D) Preparation of Coil Conductor

Next, with Cu as a wire conductor, the coil conductor 16 that is formed by winding into a substantially alpha shape the conductive belt body 18 including the substantially rectangular wire 20 covered with the insulating film 22 is prepared.

The conductive belt body 18 includes the substantially linear rectangular wire 20 that is substantially rectangular in cross section, and the insulating film 22 that covers the surface of the substantially rectangular wire 20. The conductive belt body 18 includes the plate surfaces 18*a* and the plate surfaces 18*b* that face each other, and the side end surfaces 18*c* and the side end surfaces 18*d* that face each other. In the conductive belt body 18 of the coil conductor 16, the plate surfaces 18*a* and the plate surfaces 18*b* are orthogonal to the side end surfaces 18*c* and the side end surfaces 18*d*. In order to acquire the conductive belt body 18, first, the entire surface of the substantially rectangular wire 20 is substantially uniformly coated with the insulating film 22. Next, only the side end surfaces 18*c* of the conductive belt body 18 are further coated with the insulating film 22 to acquire the conductive belt body 18 as that as shown in FIG. 6. Note that only both the side end surfaces 18*c* and the side end surfaces 18*d* may be further coated with the insulating film 22. Therefore, the conductive belt body 18 as that shown in FIG. 7 is acquired. The substantially rectangular wire 20 may be coated with the insulating film 22 by, for example, dipping.

In order to acquire the conductive belt body 18, first, the entire surface of the substantially rectangular wire 20 may be substantially uniformly coated with the insulating film 22. Then, the conductive belt body 18 may be wound into a substantially alpha shape and then the first principal surface 16*a* and the second principal surface 16*b* of the coil conductor 16 may be coated with the coil insulating film 24, as a result of which it is possible to acquire the coil conductor 16 as that shown in FIG. 8A.

Further, in order to acquire the conductive belt body 18, first, the entire surface of the substantially rectangular wire 20 may be substantially uniformly coated with the insulating film 22. Then, the conductive belt body 18 may be wound into a substantially alpha shape and then the first principal surface 16*a* and the second principal surface 16*b* of the coil conductor 16 and the first side surface 16*c* and the second side surface 16*d* of the coil conductor 16 may be substantially uniformly coated with the coil insulating film 24. Then, only the first principal surface 16*a* and the second principal surface 16*b* of the coil conductor 16 may be further coated with the coil insulating film 24, as a result of which it is possible to acquire the coil conductor 16 as that shown in FIG. 9.

Note that the first side surface 16*c* and the second side surface 16*d* of the coil conductor 16 are orthogonal to the first principal surface 16*a* and the second principal surface 16*b* of the coil conductor 16.

(E) Fabrication of Collective Base

Next, if necessary, the insulating film 22 at a region that is about 50 μm from an end of the coil conductor 16 is removed by nipper-like scissors. Therefore, although not shown, an insulating film removal portion, which is a portion that is not covered in a substantially annular shape with the insulating film 22 with an extension direction of the coil conductor 16 being a center axis, is formed. Note that the insulating film 22 can be removed by burning off the region as a result of heating it, or by dissolving the region with a chemical liquid or laser.

Next, the body 12 having the coil conductor 16 buried therein is manufactured.

FIGS. 17A to 17D is a manufacturing process diagram of an embodiment of manufacturing a first molded body in the method of manufacturing the coil component. FIGS. 18A to 18D is a manufacturing process diagram of an embodiment of manufacturing the collective base in the method of manufacturing the coil component.

Figure 17A:
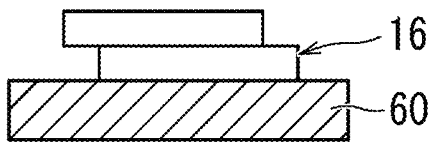
FIGS. 17A to 17D are a manufacturing process diagram of an embodiment of manufacturing a first molded body in a method of manufacturing a coil component.

First, as shown in FIG. 17A, a first die 60 is prepared, and coil conductors 16 are disposed in a matrix on the first die 60.

Figure 17B:
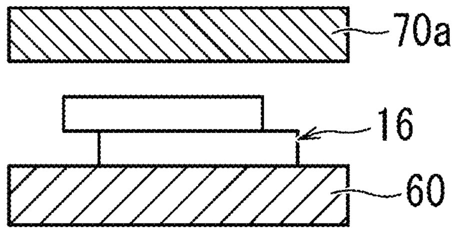
Figure 17C:
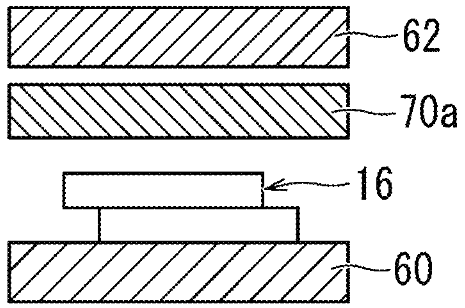
Figure 17D:
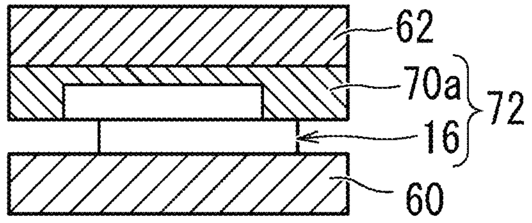

Next, as shown in FIG. 17B, a first magnetic-body sheet 70*a* including a mixture of the first metal magnetic-body particles, the second metal magnetic-body particles, and the resin material is superimposed upon the coil conductors 16, and, then, as shown in FIG. 17C, a second die 62 is disposed on a side of an upper surface of the first magnetic-body sheet 70*a*. Then, as shown in FIG. 17D, the first magnetic-body sheet 70*a* is sandwiched between the coil conductors 16 on the first die 60 and the second die 62, and is subjected to primary press-molding in a direction of the winding axis O. Due to the primary press-molding, at least a part of the coil conductors 16 is buried in the sheet, the inside of such coil conductors 16 is filled with the mixture, as a result of which a first molded body 72 is fabricated.

Figure 18A:
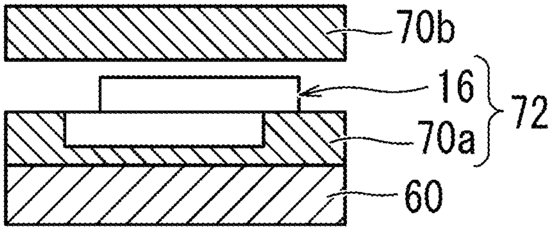
FIGS. 18A to 18D are a manufacturing process diagram of an embodiment of manufacturing a collective base in the method of manufacturing the coil component.
Figure 18B:
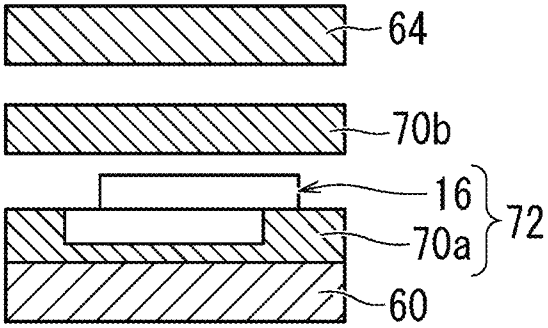
Figure 18C:
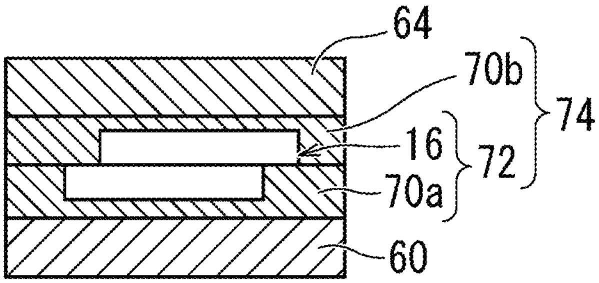

Next, as shown in FIG. 18A, the first molded body 72 in which the coil conductors 16 acquired by the primary press-molding are buried is separated from the second die 62, is turned upside down, and is disposed on the first die 60. Then, a different second magnetic-body sheet 70*b* is superimposed upon a surface at which the coil conductors 16 are exposed. Next, as shown in FIG. 18B, a third die 64 is disposed on a side of an upper surface of the second magnetic-body sheet 70*b*. Then, as shown in FIG. 18C, the second magnetic-body sheet 70*b* is sandwiched between the first molded body 72 on the first die 60 and the third die 64 to perform a secondary pressing operation in the direction of the winding axis O.

Figure 18D:
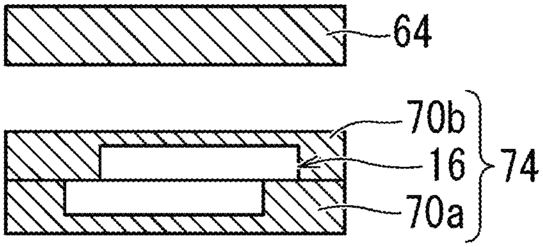

Next, after the secondary pressing operation, as shown in FIG. 18D, the third die 64 is separated, as a result of which the collective base (second molded body) 74 in which all of the coil conductors 16 are buried in the first magnetic-body sheet 70*a* and the second magnetic-body sheet 70*b* is fabricated.

(F) Fabrication of Body

Next, the first die 60 and the third die 64 are separated, and, as shown in FIG. 18D, after fabricating the collective base 74, a cutting tool, such as a dicer, is used to cut the collective base 74 along a cutting line into individual pieces, as a result of which the body 12 in which the coil conductor 16 is buried therein so that the first exposed portion 34*a* and the second exposed portion 34*b* of the coil conductor 16 are exposed from the respective end surfaces of the body 12 is fabricated. The collective base 74 can divided into each body 12 with a dicing blade, various laser devices, a dicer, various cutting tools, or a die. In a desirable mode, a cut surface of each body 12 is subjected to barrel grinding.

Next, the protective layer 50 is formed on the entire surface of the body acquired above. It is possible to form the protective layer 50 by, for example, electrodeposition, a spray method, or a dip method.

By irradiating with laser the vicinity of a location at which the first exposed portion 34*a* and the second exposed portion 34*b* of the coil conductor 16 of the body 12 covered with the protective layer 50 acquired above are disposed, a portion of the insulating film 22 at the vicinity of the location at which the first exposed portion 34*a* and the second exposed portion 34*b* of the coil conductor 16 are disposed, a portion of the insulating film that covers the metal magnetic-body particles, and the protective layer 50 are removed, and the metal magnetic-body particles are melted. Note that the method of removing the protective layer 50 can be, in addition to the laser irradiation method, for example, a blasting method or a grinding method.

(G) Formation of External Electrodes

Next, the first external electrode 40*a* is formed on the first end surface 12*e* of the body 12, and the second external electrode 40*b* is formed on the second end surface 12*f*.

First, the body 12 is subjected to electrolytic barrel plating to plate the body 12 with Cu, as a result of which the underlying electrode layers are formed. Next, the Ni plating layers are formed by plating the surface of each underlying electrode layer with Ni and the Sn plating layers are further formed by plating with Sn, as a result of which the external electrodes 40 are formed. Therefore, the first exposed portion 34*a* of the coil conductor 16 is electrically connected to the first external electrode 40*a*, and the second exposed portion 34*b* of the coil conductor 16 is electrically connected to the second external electrode 40*b*. Note that the underlying electrode layers formed by the plating with Cu may be formed by electroless plating.

The coil component 10 is manufactured as described above.

Note that the first molded body 72 and the collective base 74 may be manufactured by using granulation powder instead of the first magnetic-body sheet 70*a* and the second magnetic-body sheet 70*b*.

In this case, first, the first die is prepared and the coil conductors 16 are disposed on the first die.

Next, the granulation powder is disposed on the coil conductors 16 and is press-molded in the direction of the winding axis O, as a result of which the first molded body 72 is formed. Next, the first molded body 72 is separated from the second die, is turned upside down, and is disposed on the first die 60. Then, the granulation powder is disposed on the first molded body 72 and is press-molded in the direction of the winding axis O, as a result of which the collective base (the second molded body) 74 can be fabricated.

The granulation powder for constituting the magnetic-body section 14 can be acquired by mixing first metal magnetic powder and second metal magnetic powder with thermosetting epoxy resin at a predetermined proportion and kneading the mixture.

When the coil component 110 is to be manufactured, the coil conductor 116 that is formed by winding in the form of an edgewise coil the conductive belt body 118 that is formed from the substantially rectangular wire 120 covered with the insulating film 122 is prepared.

The conductive belt body 118 includes the substantially linear rectangular wire 120 that is substantially rectangular in cross section, and the insulating film 122 that covers the surface of the substantially rectangular wire 120. In order to acquire the conductive belt body 118, first, the entire surface of the substantially rectangular wire 120 is substantially uniformly coated with the insulating film 122. Next, only the plate surfaces 118*a* of the conductive belt body 118 are further coated with the insulating film 122 to acquire the conductive belt body 118 as that shown in FIG. 15. Note that only both the plate surfaces 118*a* and the plate surfaces 118*b* may be further coated with the insulating film 122. Therefore, as shown in FIG. 16, the conductive belt body 118 is acquired. The substantially rectangular wire 120 may be coated with the insulating film 122 by, for example, dipping.

According to the method of manufacturing the coil component according to the embodiment, by using the coil conductor 16, the insulating film 22 that is disposed on the side of the first principal surface 16*a* of the coil conductor 16 facing the first principal surface 12*a* of the body 12 is thick. Therefore, impact resistance is increased, as a result of which it is possible to provide a coil component that makes it possible to suppress occurrence of short-circuit defects that occur when the magnetic-body particles that constitute the magnetic-body section 14 pierce through the insulating film 22.

Note that, although the embodiments of the present disclosure are disclosed in the description above in this way, the present disclosure is not limited to such embodiments.

That is, various changes can be made to the embodiments described above in terms of the mechanism, the shape, the material, the quantity, the position, and the configuration, without departing from the scope of the technical idea and the object of the present disclosure, and such changes are included in the present disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a body that includes a coil comprising a winding portion which a substantially rectangular wire covered with an insulating film is wound, and an extended portion that extends to the winding portion, a magnetic-body section that contains a magnetic-body particle and a resin, and a first principal surface and a second principal surface that faces the first principal surface, and at the substantially rectangular wire, an average thickness of a portion of the insulating film that covers a first surface of the winding portion facing the first principal surface and extending in a direction orthogonal to a winding axis of the coil of the winding portion is larger than an average thickness of a portion of the insulating film that covers a second surface of the winding portion facing the second principal surface and extending in the direction orthogonal to the winding axis, and is larger than average thicknesses of portions of the insulating film that cover other surfaces of the winding portion, the other surfaces being orthogonal to the first surface; and an external electrode that is electrically connected to an exposed surface of an extended portion of the coil and that is disposed at a surface of the body, the exposed surface being exposed at the surface of the body.

2. The coil component according to claim 1, wherein the magnetic-body particle is a metal magnetic-body particle.

3. The coil component according to claim 2, wherein the metal magnetic-body particle includes at least two or more types of metal magnetic-body particles, and when an average particle size D50 of, among the metal magnetic-body particles, the metal magnetic-body particle having the average particle size D50 that is small is D, an average thickness $t_a$ of a thicker one of the portions of the insulating film of the coil satisfies a relationship of $D<t_a$.

4. The coil component according to claim 2, wherein at the substantially rectangular wire, the portion of the insulating film that covers the second surface has two or more layers.

5. The coil component according to claim 1, wherein at the substantially rectangular wire, the average thickness of the portion of the insulating film that covers the first surface is from about 4 μm to about 20 μm, and the average thicknesses of the portions of the insulating film that cover the other surfaces, which are orthogonal to the first surface, of the substantially rectangular wire are from about 1 μm to about 10 μm.

6. The coil component according to claim 5, wherein at the substantially rectangular wire, the average thickness of the portion of the insulating film that covers the second surface is from about 4 μm to about 20 μm.

7. The coil component according to claim 1, wherein at the substantially rectangular wire, the portion of the insulating film that covers the first surface has two or more layers.

8. The coil component according to claim 7, wherein an outermost layer of the portion of the insulating film having the two or more layers contains a thermally adhesive component.

9. A coil component comprising:

a body that includes a coil comprising a winding portion which a substantially rectangular wire covered with an insulating film is wound, and an extended portion that extends to the winding portion, a magnetic-body section that contains a magnetic-body particle and a resin, and a first principal surface and a second principal surface that faces the first principal surface, and at the coil, an average thickness of a portion of the insulating film that configures a first surface of the winding portion facing the first principal surface and extending in a direction orthogonal to a winding axis of the coil of the winding portion is larger than an average thickness of a portion of the insulating film that covers a second surface of the winding portion facing the second principal surface and extending in the direction orthogonal to the winding axis, and is larger than average thicknesses of portions of the insulating film that configure other surfaces of the winding portion, the other surfaces being orthogonal to the first surface; and an external electrode that is electrically connected to an exposed surface of an extended portion of the coil and that is disposed at a surface of the body, the exposed surface being exposed at the surface of the body.

10. The coil component according to claim 9, wherein the magnetic-body particle is a metal magnetic-body particle.

11. The coil component according to claim 10, wherein the metal magnetic-body particle includes at least two or more types of metal magnetic-body particles, and wherein, when an average particle size D50 of, among the metal magnetic-body particles, the metal magnetic-body particle having the average particle size D50 that is small is D, an average thickness $t_a$ of a thicker one of the portions of the insulating film of the coil satisfies a relationship of $D<t_a$.

12. The coil component according to claim 9, wherein at the coil, the average thickness of the portion of the insulating film that configures the first surface is from about 4 μm to about 20 μm, and the average thicknesses of the portions of the insulating film that configure the other surfaces, which are orthogonal to the first surface, of the coil are from about 5 μm to about 40 μm.

13. The coil component according to claim 12, wherein at the coil, the average thickness of the portion of the insulating film that configures the second surface is from about 5 μm to about 40 μm.

14. The coil component according to claim 9, wherein at the coil, the portion of the insulating film that configures the first surface has two or more layers.

15. The coil component according to claim 9, wherein at the coil, the portion of the insulating film that configures the second surface has two or more layers.

* * * * *